(12) United States Patent  
Kasuya

(10) Patent No.: US 11,947,276 B2
(45) Date of Patent: Apr. 2, 2024

(54) LIGHT EMITTING DEVICE AND IMAGE FORMING APPARATUS

(71) Applicant: FUJIFILM Business Innovation Corp., Tokyo (JP)

(72) Inventor: Yosuke Kasuya, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/940,550

(22) Filed: Sep. 8, 2022

(65) Prior Publication Data

US 2023/0004101 A1 Jan. 5, 2023

Related U.S. Application Data

(63) Continuation of application No. PCT/JP2020/030706, filed on Aug. 12, 2020.

(30) Foreign Application Priority Data

Mar. 25, 2020 (JP) .................. 2020-054934

(51) Int. Cl.
*G03G 15/00* (2006.01)
*B41J 2/00* (2006.01)
(Continued)

(52) U.S. Cl.
CPC .......... *G03G 15/04054* (2013.01); *B41J 2/45* (2013.01); *F21K 9/237* (2016.08);
(Continued)

(58) Field of Classification Search
CPC ....... G03G 15/04054; G03G 15/04063; G03G 21/206; G03G 2221/1645;
(Continued)

(56) References Cited

U.S. PATENT DOCUMENTS 9,518,724 B2 * 12/2016 Kwak ...................... F21K 9/20
9,981,482 B2    5/2018 Tanaka
(Continued)

FOREIGN PATENT DOCUMENTS

EP     3187780 A1 *  7/2017  ............. B05D 3/065
JP     S63-045564 U    3/1988
(Continued)

OTHER PUBLICATIONS

Sep. 29, 2020 Search Report issued in International Patent Application No. PCT/JP2020/030706.
(Continued)

*Primary Examiner* — Robert B Beatty
(74) *Attorney, Agent, or Firm* — Oliff PLC

(57) ABSTRACT

A light emitting device includes: a base that extends in one direction, and has an opening; plural light emitting units that are disposed to be displaced from each other in the one direction on the front surface side of the base, the light emitting units each including a support that extends in the one direction, and plural light sources that are disposed in the one direction on the support; and an air blowing unit that blows air toward the light emitting units through the opening.

19 Claims, 13 Drawing Sheets

(51) Int. Cl.
- *B41J 2/45* (2006.01)
- *F21K 9/237* (2016.01)
- *G03G 15/04* (2006.01)
- *G03G 21/20* (2006.01)
- *G06K 15/00* (2006.01)
- *G06K 15/12* (2006.01)
- *F21V 29/67* (2015.01)
- *F21Y 103/10* (2016.01)
- *F21Y 115/10* (2016.01)

(52) U.S. Cl.
CPC ....... *G03G 21/206* (2013.01); *G06K 15/1261* (2013.01); *F21V 29/67* (2015.01); *F21Y 2103/10* (2016.08); *F21Y 2115/10* (2016.08); *G03G 15/04036* (2013.01); *G03G 2215/0409* (2013.01)

(58) Field of Classification Search
CPC ... G03G 2215/0407; G03G 2215/0409; G03G 2215/0412; B41J 2/447; B41J 2/4473; B41J 2/45; B41J 2/455; G06K 15/1247; G06K 15/1261; F21V 29/67; F21V 29/673; F21V 29/60; F21V 29/503; F21Y 2103/10; F21Y 2115/10; F21Y 2115/15; F21Y 2115/20; F21K 9/237
USPC .......................................... 399/92, 118, 220
See application file for complete search history.

(56) References Cited

U.S. PATENT DOCUMENTS

| | | | |
|---|---|---|---|
| 11,347,159 B2* | 5/2022 | Kasuya | B41J 2/451 |
| 11,556,075 B2* | 1/2023 | Kasuya | B41J 2/451 |
| 2003/0067531 A1 | 4/2003 | Kerr et al. | |
| 2011/0216150 A1* | 9/2011 | Takahashi | G03G 15/04072 |
| | | | 156/285 |
| 2017/0282593 A1 | 10/2017 | Tanaka | |
| 2019/0128511 A1* | 5/2019 | Watanabe | F21V 29/83 |

FOREIGN PATENT DOCUMENTS

| | | | | |
|---|---|---|---|---|
| JP | H05-177864 A | 7/1993 | | |
| JP | H11-109837 A | 4/1999 | | |
| JP | 2006-069061 A | 3/2006 | | |
| JP | 2007-072321 A | 3/2007 | | |
| JP | 2008-238415 A | 10/2008 | | |
| JP | 2017-177664 A | 10/2017 | | |
| JP | 2019-106324 A | 6/2019 | | |
| WO | WO-2012014519 A1 * | 2/2012 | | G03G 15/04054 |

OTHER PUBLICATIONS

Sep. 29, 2020 Written Opinion of the International Searching Authority issued in International Patent Application No. PCT/JP2020/030706.

Oct. 3, 2023 Office Action issued in Japanese Patent Application No. 2020-054934.

* cited by examiner

LIGHT EMITTING DEVICE AND IMAGE FORMING APPARATUS

CROSS-REFERENCE TO RELATED APPLICATIONS

This is a continuation of International Application No. PCT/JP2020/030706 filed on Aug. 12, 2020, and claims priority from Japanese Patent. Application No. 2020-054934 filed on Mar. 25, 2020.

BACKGROUND

(i) Technical Field

The present disclosure relates to a light emitting device and a drawing apparatus.

(ii) Related Art

Japanese Unexamined Patent Application Publication No. 2017-177664 discloses an exposure device including a first exposure head and a second exposure head, the first exposure head having plural first light emitting elements that are arranged in a first direction and that each emit a first beam, a first optical system that is disposed to face the plural first light emitting elements in a second direction intersecting the first direction and that causes the plural first beams emitted from the plural first light emitting elements to form an image, and a first joint, and a first base that supports the plural first light emitting elements, the first optical system, and the first joint, the second exposure head having plural second light emitting elements that are arranged in the first direction and that each emit a second beam, a second optical system that is disposed to face the plural second light emitting elements in the second direction and that causes the plural second beams emitted from the plural second light emitting elements to form an image, a second joint that is fitted to the first joint, and a second base that supports the plural second light emitting elements, the second optical system, and the second joint. In the exposure device, the first joint is provided at a first position in the first base, the position corresponding to an image formation position of the first optical system, and the second joint is provided at a second position in the second base, the position corresponding to an image formation position of the second optical system.

SUMMARY

Aspects of non-limiting embodiments of the present disclosure relate to a light emitting device in which the dimension of the light emitting device in the width direction is reduced compared with a case in which an air blowing unit is disposed on the outer side of a base in the width direction, and a drawing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a light emitting device including: a base that extends in one direction, and has an opening; plural light emitting units that are disposed to be displaced from each other in the one direction on the front surface side of the base, wherein the plural of light emitting units each includes a support that extends in the one direction, and plural light sources that are disposed in the one direction on the support; and an air blowing unit that blows air toward the plural of light emitting units through the opening.

BRIEF DESCRIPTION OF THE DRAWINGS

Exemplary embodiments of the present disclosure will be described in detail based on the following figures, wherein.

DETAILED DESCRIPTION

Exemplary embodiments (hereinafter referred to as the present exemplary embodiments) for implementing the present disclosure will be described below.

First Exemplary Embodiment

Image Forming Apparatus 10

Figure 1:
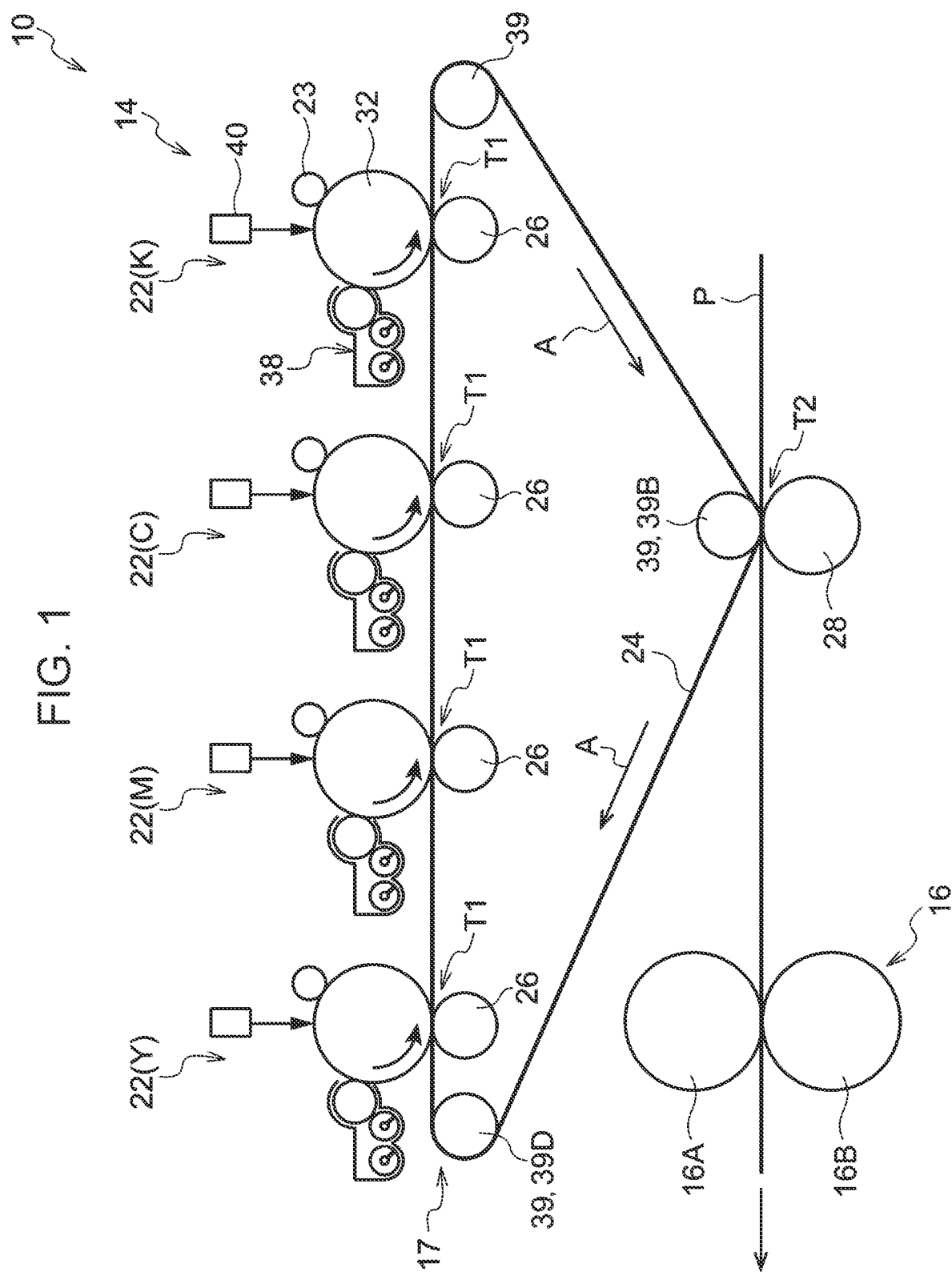
FIG. 1 is a schematic view of an image forming apparatus that includes an exposure device according to a first exemplary embodiment.

FIG. 1 is a schematic view of a configuration of an image forming apparatus 10 that includes an exposure device 40 according to a first exemplary embodiment. First, a configuration of the image forming apparatus 10 will be described. Next, the exposure device 40 to be used in the image forming apparatus 10 will be described. The image forming apparatus 10 is an example of a drawing apparatus, and the exposure device 40 is an example of a light emitting device. In one example, the image forming apparatus 10 is an image forming apparatus that forms an image with multiple colors. The image forming apparatus 10 is, for example, a full-color printer for commercial printing for which high image quality is particularly required.

The image forming apparatus 10 is an image forming apparatus for wide widths compatible with widths (that is, widths exceeding 364 mm) exceeding the width of a recording medium P in B3 portrait feeding. In one example, the image forming apparatus 10 is compatible with the recording medium P of a size of 420 mm or more, which is A2 portrait feeding, and a size of 1456 mm or less, which is B0 landscape feeding. For example, the image forming apparatus 10 is compatible with 728 mm, which is B2 landscape feeding.

The image forming apparatus 10 in FIG. 1 is one example of an image forming apparatus that forms an image on a recording medium. Specifically, the image forming apparatus 10 is an electrophotographic image forming apparatus that forms a toner image (one example of an image) on the recording medium P. The toner is one example of a powder body. More specifically, the image forming apparatus 10 includes an image formation section 14 and a fixing device 16. Portions (the image formation section 14 and the fixing device 16) of the image forming apparatus 10 will be described below.

Image Formation Section 14

The image formation section 14 has a function of forming a toner image on the recording medium P.

Specifically, the image formation section 14 has a toner-image forming unit 22 and a transfer device 17.

Toner-Image Forming Unit 22

To form a toner image of each color, plural toner-image forming units 22 illustrated in FIG. 1 are included. In the present exemplary embodiment, the toner-image forming units 22 for a total of four colors of yellow (Y), magenta (M), cyan (C), and black (K) are provided. The signs (Y), (M), (C), and (K) in FIG. 1 indicate configuration parts corresponding to the aforementioned colors.

The toner-image forming units 22 for respective colors have the same configuration except for toner to be used. Thus, as a representative of the toner-image forming units 22 of the respective colors, portions of the toner-image forming unit 22(K) are given reference signs in FIG. 1.

Specifically, each of the toner-image forming units 22 for the respective colors has a photoreceptor drum 32 that rotates in one direction (for example, in a counterclockwise direction in FIG. 1). The photoreceptor drum 32 is one example of a cylindrical member. A photoreceptor of a surface of the photoreceptor drum 32 is one example of a region in which a photosensitive material is disposed. In addition, each of the toner-image forming units 22 for the respective colors has a charger 23, an exposure device 40, and a developing device 38.

In each of the toner-image forming units 22 for the respective colors, the charger 23 electrifies the photoreceptor drum 32. Then, the exposure device 40 exposes the photoreceptor drum 32 electrified by the charger 23 to form an electrostatic latent image on the photoreceptor drum 32. Further, the developing device 38 develops the electrostatic latent image formed on the photoreceptor drum 32 by the exposure device 40 to form a toner image.

The photoreceptor drum 32 rotates with the electrostatic latent image formed as described above being held on the outer periphery of the photoreceptor drum 32, and the electrostatic latent image is transported to the developing device 38. A specific configuration of the exposure device 40 will be described later.

Transfer Device 17

The transfer device 17 illustrated in FIG. 1 is a device that transfers a toner image formed by the toner-image forming unit 22 to the recording medium P. Specifically, the transfer device 17 superposes and first-transfers toner images on the photoreceptor drums 32 for the respective colors to a transfer belt 24, as an intermediate transfer body, and second-transfers the superposed toner images to the recording medium P. Specifically, as illustrated in FIG. 1, the transfer device 17 includes the transfer belt 24, first transfer rollers 26, and a second transfer roller 28.

Each of the first transfer rollers 26 is a roller that transfers the toner image on a corresponding one of the photoreceptor drums 32 for the respective colors to the transfer belt 24 at a first transfer position T1 between the photoreceptor drum 32 and the first transfer roller 26. In the present exemplary embodiment, a first transfer electric field is applied between the first transfer roller 26 and the photoreceptor drum 32 to thereby transfer the toner image formed on the photoreceptor drum 32 to the transfer belt 24 at the first transfer position T1.

Toner images are transferred from the photoreceptor drums 32 for the respective colors to the outer peripheral surface of the transfer belt 24. Specifically, the transfer belt 24 is configured as follows. As illustrated in FIG. 1, the transfer belt 24 forms an annular shape and is in an orientation determined by being wound around plural rollers 39.

For example, the transfer belt 24 turns in the arrow-A direction in response to, among the plural rollers 39, a driving roller 39D being rotatably driven by a driving unit (not illustrated). Among the plural rollers 39, a roller 39B illustrated in FIG. 1 is a counter roller 39B that faces the second transfer roller 28.

The second transfer roller 28 is a roller that transfers the toner images transferred on the transfer belt 24 to the recording medium P at a second transfer position T2 between the counter roller 39B and the second transfer roller 28. In the present exemplary embodiment, a second transfer electric field is applied between the counter roller 39B and the second transfer roller 28 to thereby transfer the toner images transferred on the transfer belt 24 to the recording medium P at the second transfer position T2.

Fixing Device 16

The fixing device 16 illustrated in FIG. 1 is a device that fixes the toner images transferred on the recording medium P by the second transfer roller 28 to the recording medium P. Specifically, as illustrated in FIG. 1, the fixing device 16 has a heating roller 16A as a heating member and a pressurizing roller 16B as a pressurizing member. The fixing device 16 heats and pressurizes the recording medium P by the heating roller 16A and the pressurizing roller 16B to thereby fix the toner images formed on the recording medium P to the recording medium P.

Exposure Device 40

Figure 2:
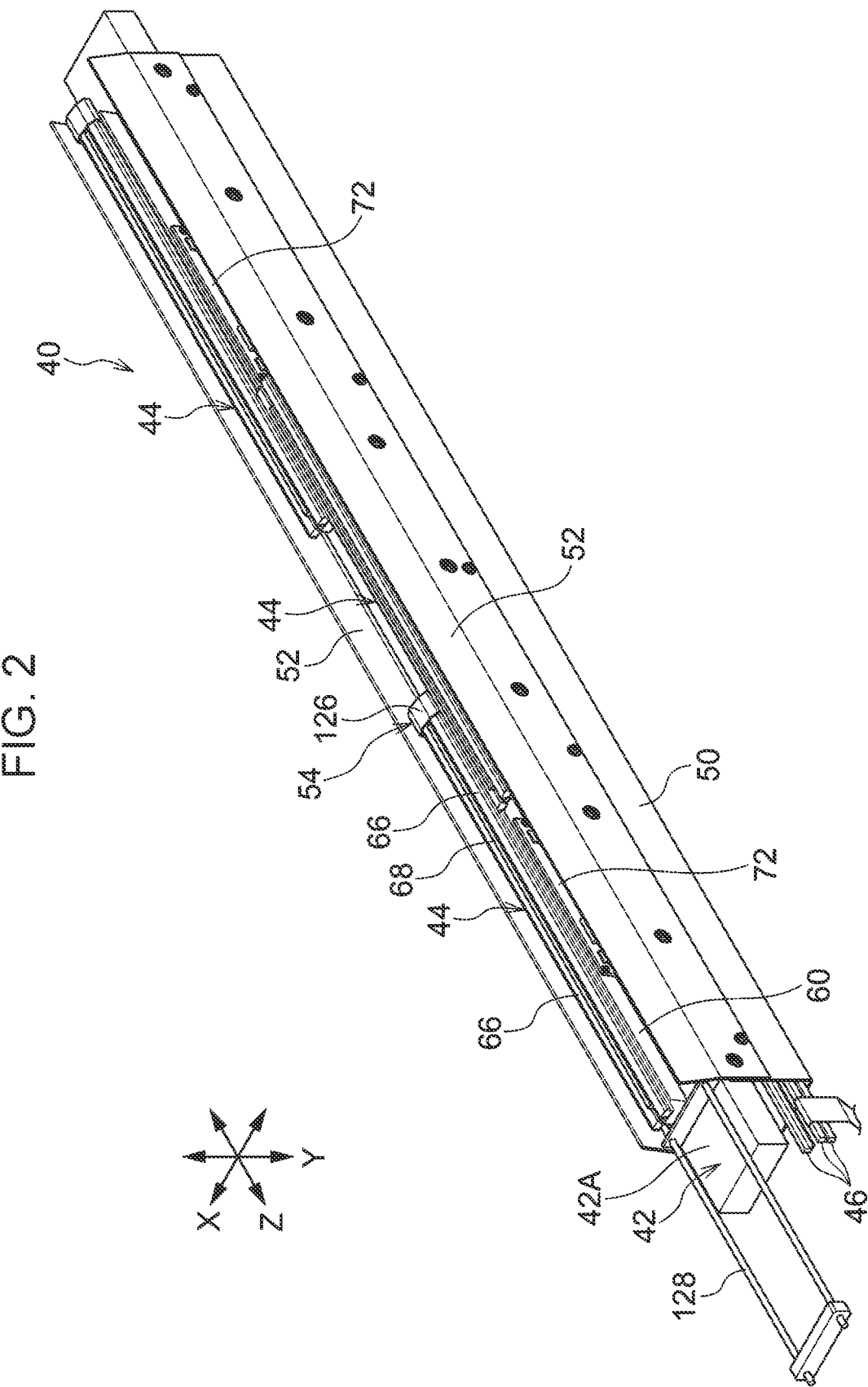
FIG. 2 is a perspective view of the exposure device to be used in the image forming apparatus.
Figure 3:
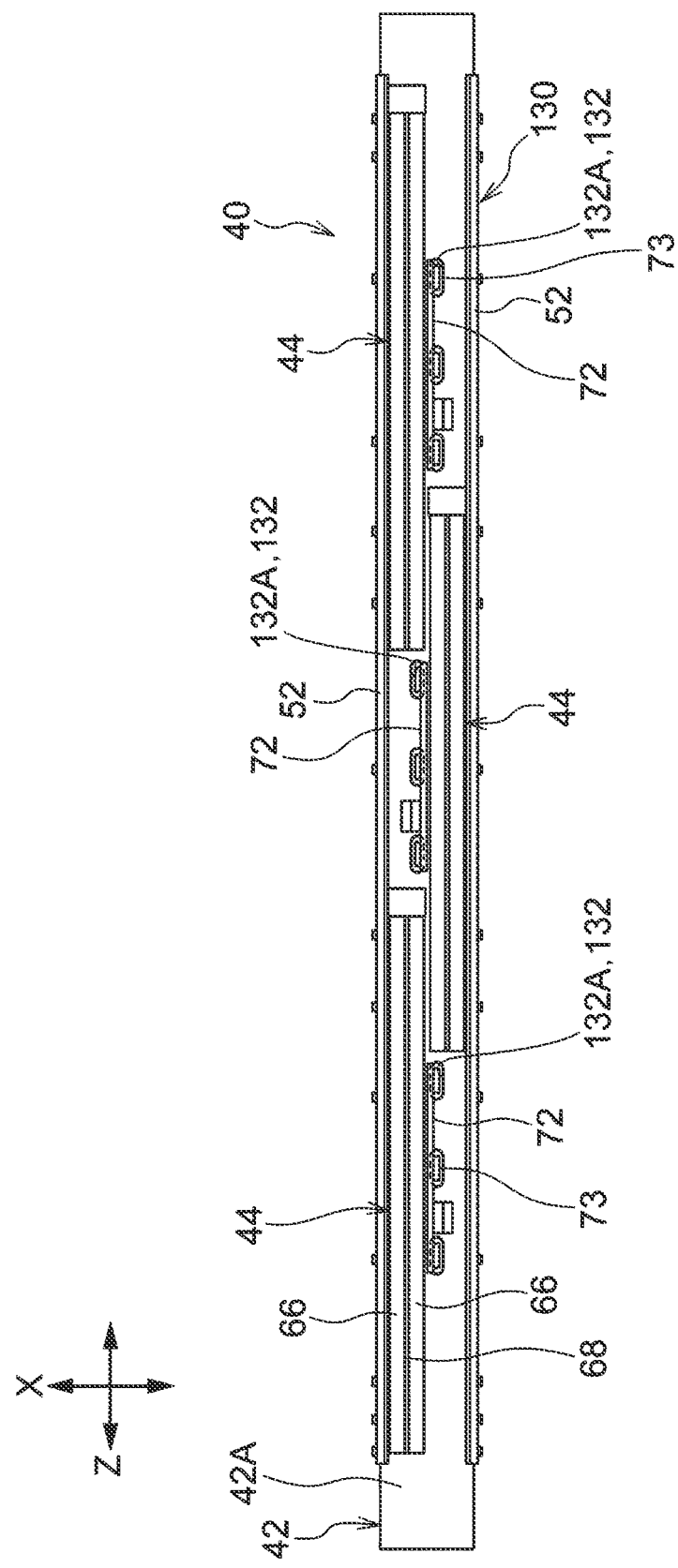
FIG. 3 illustrates the exposure device as viewed in the up-down direction.

Next, a configuration of the exposure device 40, which is a part according to the present exemplary embodiment, will be described. FIG. 2 is a perspective view of the configuration of the exposure device 40. FIG. 3 is a plan view of the exposure device 40 as viewed in the up-down direction. In the following description, the arrow-X direction and the arrow-Y direction indicated in FIG. 3 denote the width direction of the exposure device 40 and the height direction of the exposure device 40, respectively. The arrow-Z direction orthogonal to each of the device-width direction and the device-height direction denotes the depth direction of the exposure device 40. The width direction and the height direction mentioned above are, however, determined for convenience of description. Thus, the configuration of the exposure device 40 is not limited by these directions.

Overall Configuration of Exposure Device 40

The overall configuration of the exposure device 40 will be described first, and members of the exposure device 40 will be described next.

As illustrated in FIG. 2 and FIG. 3, the exposure device 40 includes a base 42 that extends in one direction (the arrow-Z direction in the present exemplary embodiment), and plural light emitting units 44 provided on one side (upper side in the up-down direction in FIG. 2 and FIG. 3) of the base 42 in the arrow-Y direction. In the present exemplary embodiment, three light emitting units 44 that extend in the one direction of the base 42 are provided. The base 42 is a long member having a rectangular shape in the plan view illustrated in FIG. 3. The light emitting units 44 have configurations identical to each other and are long members each having a rectangular shape in the plan view illustrated in FIG. 3. The length of each light emitting unit 44 in one direction (that is, the longitudinal direction) is shorter than the length of the base 42 in the one direction (that is, the longitudinal direction).

In one example, the three light emitting units 44 are disposed to be displaced from each other in one direction (the arrow-Z direction) of the base 42 and are disposed to be displaced from each other in the width direction orthogonal to the one direction of the base 42, in other words, in the short direction (the arrow-X direction) of the base 42. The exposure device 40 is disposed in the axial direction of the photoreceptor drum 32 (refer to FIG. 1). The length of the exposure device 40 in one direction (arrow-Z direction) is larger than or equal to the length of the photoreceptor drum 32 in the axial direction. Any one or more of the three light emitting units 44 face a region in which the photoreceptor of the surface of the photoreceptor drum 32 is provided. Consequently, light emitted from the exposure device 40 is radiated to the surface of the photoreceptor drum 32.

The exposure device 40 in FIG. 2, FIG. 3, and the like is illustrated such that a side of the base 42 provided with the light emitting units 44 is on the upper side in the up-down direction, and light is radiated upward from the light emitting units 44. Meanwhile, the up-down direction of the exposure device 40 is opposite in the image forming apparatus 10 illustrated in FIG. 1. In other words, in FIG. 1, the exposure device 40 is disposed such that the side of the base 42 provided with the light emitting units 44 is on the lower side in the up-down direction, and light is radiated from the light emitting units 44 toward the photoreceptor drum 32 on the lower side.

In the present exemplary embodiment, the three light emitting units 44 are disposed alternately as viewed from the upper side of the exposure device 40 in the up-down direction (refer to FIG. 3). More specifically, at both end portions of the base 42 in one direction (arrow-Z direction), two light emitting units 44 are disposed on one side of the base 42 in the short direction (arrow-X direction). At a central portion of the base 42 in the one direction (arrow-Z direction), one light emitting unit 44 is disposed on the other side of the base 42 in the short direction (arrow-X direction). End portions of the two light emitting units 44 disposed on the one side of the base 42 in the short direction (arrow-X direction) and an end portion of the one light emitting unit 44 disposed on the other side of the base 42 in the short direction (arrow-X direction) overlap each other as viewed in the short direction (arrow-X direction) of the base 42. In other words, in the one direction (arrow-Z direction) of the base 42, parts of regions to be irradiated with light from the three light emitting units 44 overlap each other.

The two light emitting units 44 disposed on the one side of the base 42 in the short direction (arrow-X direction) and the one light emitting unit 44 disposed on the other side of the base 42 in the short direction (arrow-X direction) do not overlap each other as viewed in the one direction (arrow-Z direction) of the base 42.

Figure 4:
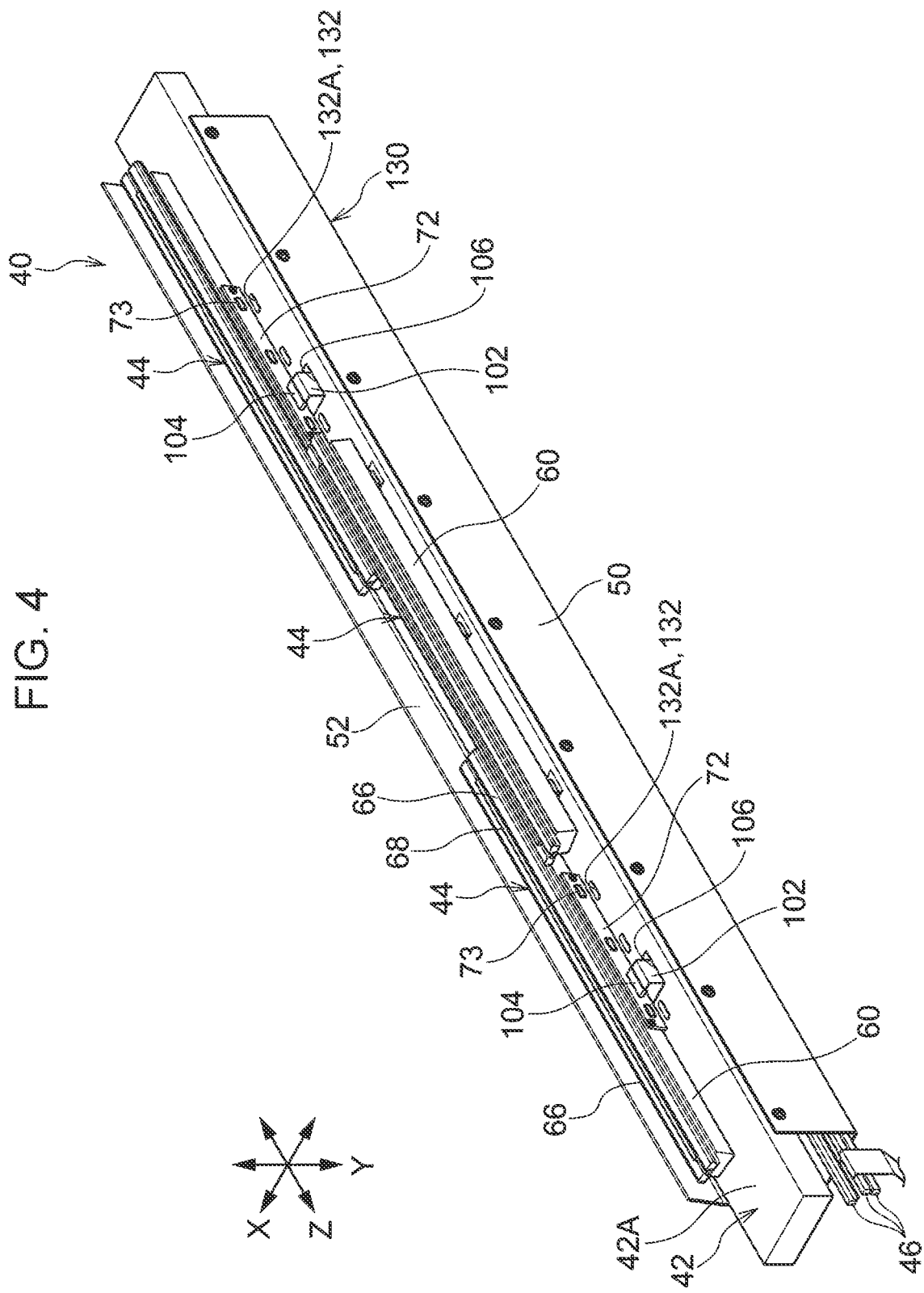
FIG. 4 is a perspective view of multiple light emitting units of the exposure device.
Figure 5:
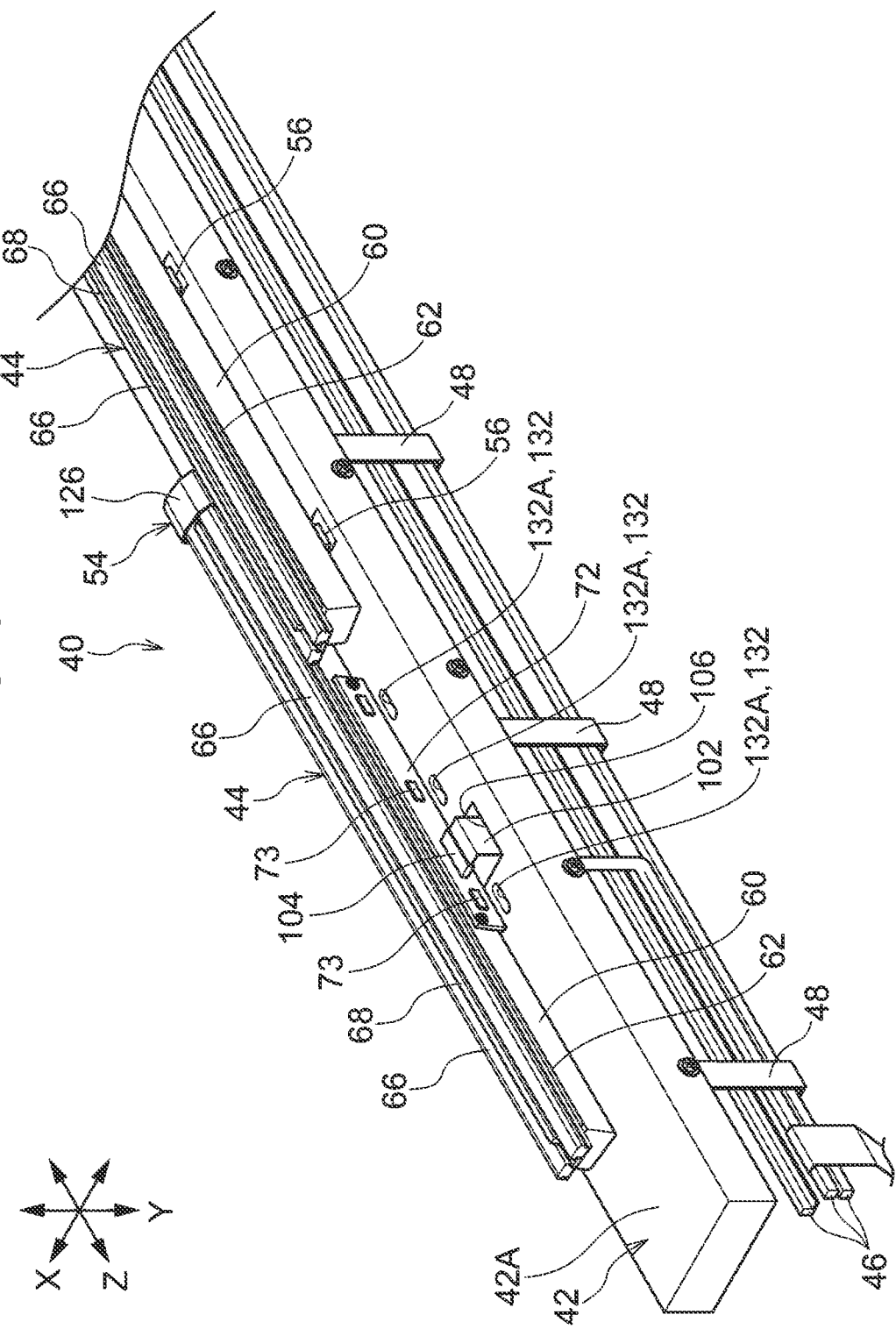
FIG. 5 is an enlarged perspective view of a portion of the exposure device.

As illustrated in FIG. 4 and FIG. 5, the exposure device 40 includes a harness 46 that is electrically connected to each of the three light emitting units 44; plural brackets 48 that hold the harness 46; and a lower covering 50 that covers the harness 46 and the brackets 48 from the outer side. The harness 46 is a collective component of a bundle of plural wires for power-supply use. The brackets 48 are attached to the base 42 and extend from the base 42 toward the other side (lower side in the up-down direction in FIG. 2) in the arrow-Y direction. The lower covering 50 is attached to the other side (lower side in the up-down direction in FIG. 2) of the base 42 in the arrow-Y direction.

As illustrated in FIG. 2 and FIG. 3, the exposure device 40 includes a side covering 52 that covers side portions of the three light emitting units 44. The side covering 52 has a plate shape and is attached at a lower end portion thereof to both sides of the base 42 in the short direction (arrow-X direction). The exposure device 40 also includes a cleaning device 54 that cleans a later-described lens portion 68 of each light emitting unit 44.

Figure 6:
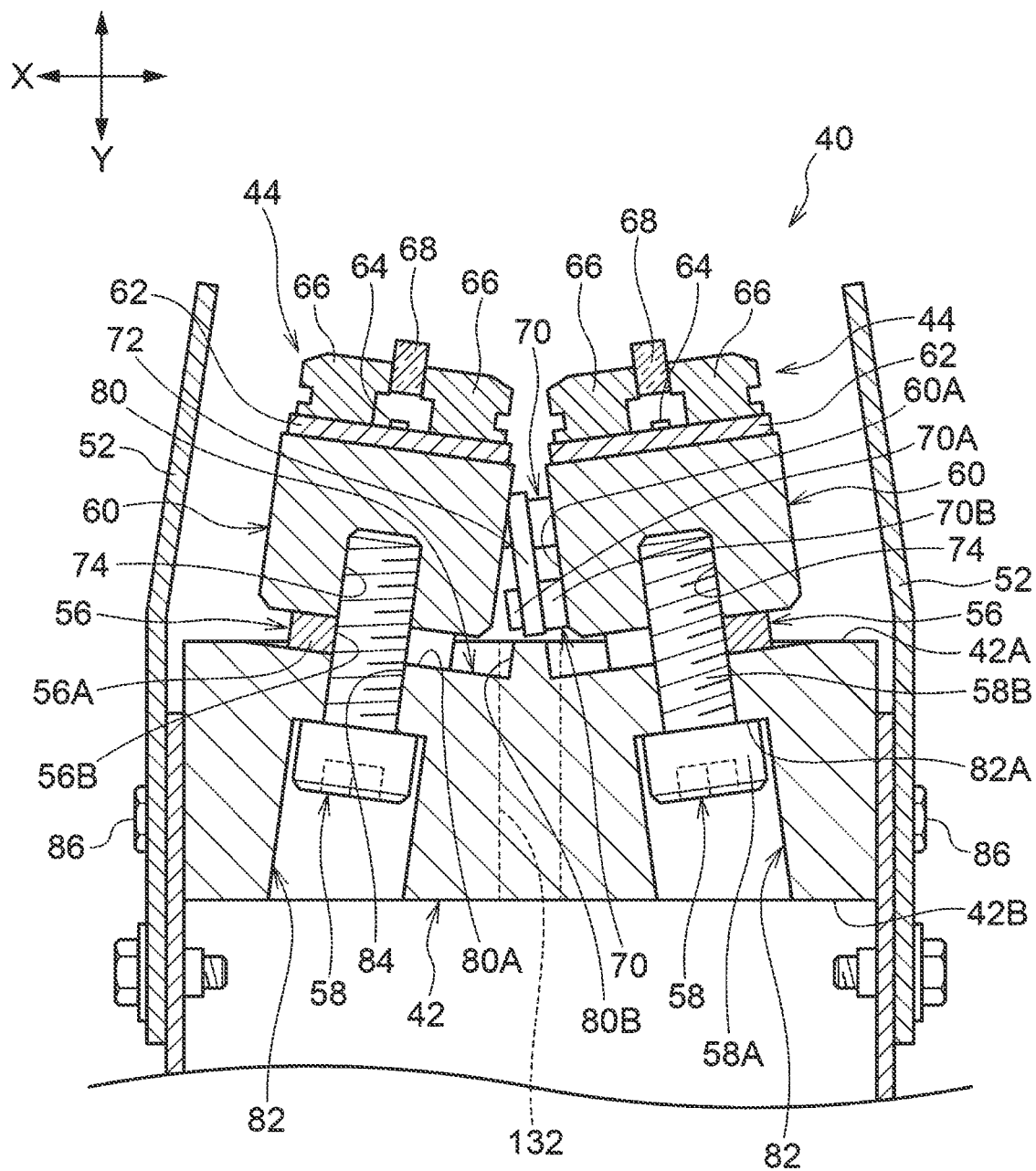
FIG. 6 is a sectional view of the plural light emitting units of the exposure device cut in the short direction.

As illustrated in FIG. 5 and FIG. 6, the exposure device 40 includes plural spacers 56 interposed between the base 42 and the light emitting units 44, and a fastening member 58 that fixes the light emitting units 44 to the base 42 with the plural spacers 56 interposed therebetween. The fastening member 58 is, for example, a member that has a spiral groove and uses the groove for fastening. In other words, the fastening member 58 is a member that has a screw mechanism and is, for example, a screw, a bolt, a vis screw, or the like.

Figure 7:
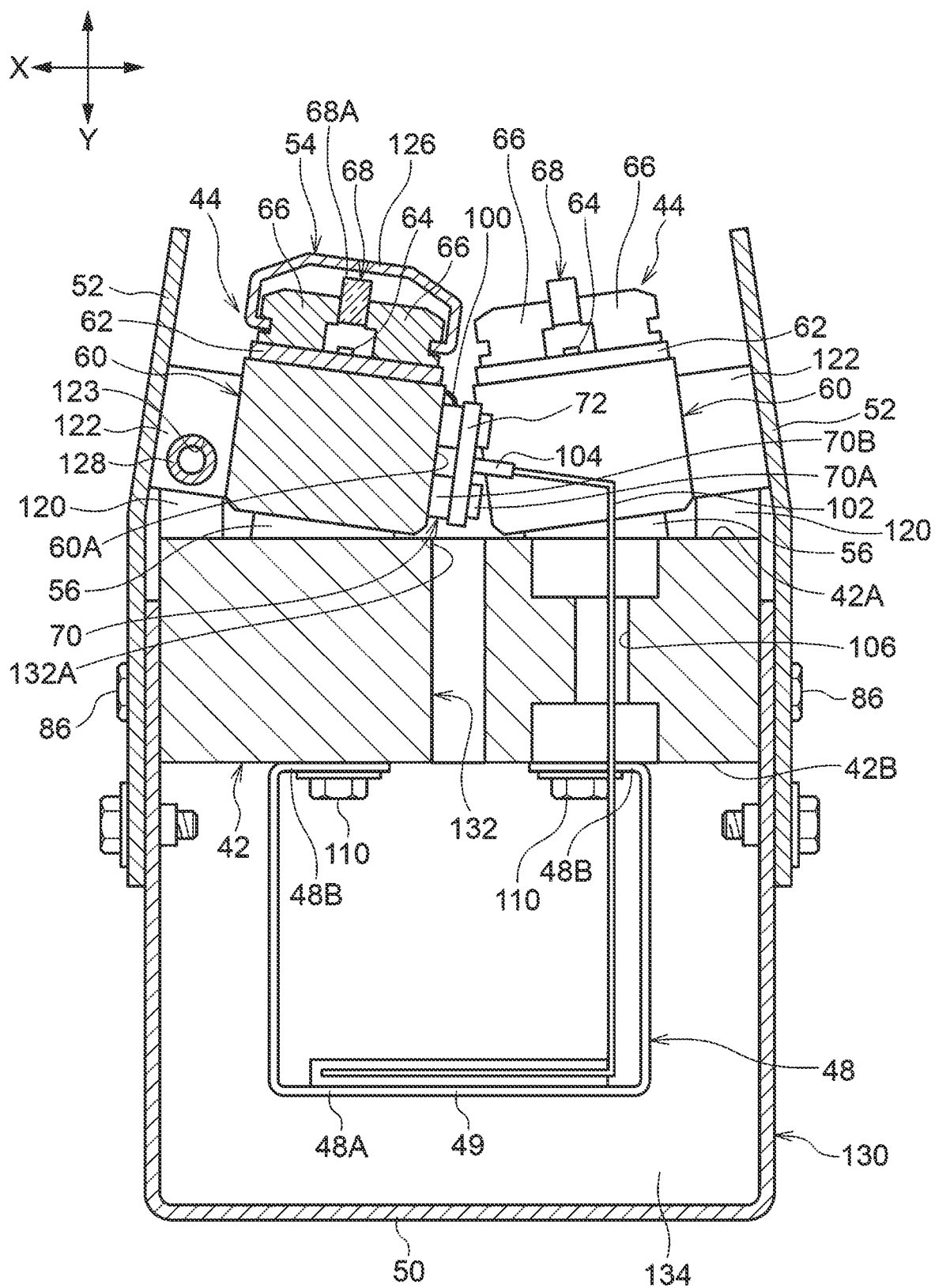
FIG. 7 is a sectional view of the exposure device cut in the short direction.

Further, as illustrated in FIG. 3, FIG. 4, and FIG. 7, the exposure device 40 includes an air supply device 130 that blows air toward the light emitting units 44 through an opening 132A provided in the base 42.

Although not illustrated, a positioning shaft that extends upward in the up-down direction is provided at each of both end portions of the base 42 in one direction (arrow-Z direction). The positioning shafts position the exposure device 40 with respect to the photoreceptor drum 32 in a radiation direction by coming into contact with a bearing member provided at each of both ends of the photoreceptor drum 32.

Base 42

As illustrated in FIG. 5 to FIG. 8, the base 42 is formed of a rectangular parallelepiped elongated member. The base 42 is disposed at a position facing the entire length of the photoreceptor drum 32 (FIG. 1) in the axial direction.

A front surface 42a of the base 42 on the upper side in the up-down direction (arrow-Y direction) is provided with a recessed portion 80 into which the spacers 56 are inserted (refer to FIG. 6). In one example, three spacers 56 are disposed at intervals in one direction (arrow-Z direction) for one light emitting unit 44. In the present exemplary embodiment, three spacers 56 are disposed for each of the three light emitting units 44.

The recessed portion 80 includes an inclined surface 80A that forms a bottom surface and that is inclined with respect to the front surface 42a of the base 42; a vertical wall 80B disposed at an end portion of the inclined surface 80A in a downward direction; and two vertical walls (not illustrated) that are disposed on both sides of the inclined surface 80A so as to be face each other (refer to FIG. 6). In one example, the inclined surface 80A for each of the two light emitting units 44 disposed on one side of the base 42 in the short direction and the inclined surface 80A for the one light emitting unit 44 disposed on the other side of the base 42 in the short direction are inclined to opposite directions to each other. In the exposure device 40, due to inclined surfaces 80A with the inclinations to the opposite directions to each other, it is adjusted such that light is radiated toward a center portion of the photoreceptor drum (refer to FIG. 1) from the two light emitting units 44 disposed on one side of the base 42 in the short direction and the one light emitting unit 44 disposed on the other side of the base 42 in the short direction.

In the present exemplary embodiment, the base 42 is formed of a metal block. The metal block in the present exemplary embodiment does not include a general sheet metal that forms a shape by bending. The metal block means a metal lump that has a thickness with which bending is not substantially impossible in a shape used as the base of the exposure device 40. In one example, the metal lump has a thickness of 10% or more of the width of the base 42. To be specific, the base 42 may be formed of a metal lump with which the thickness of the base 42 is 20% or more and 100% or less of the width of the base 42.

Image forming apparatuses for wide widths in related art are for outputting monochrome drawings for which high image quality is not required, compared with full-color printers for commercial printing, and each include a sheet metal as a base. In contrast, the image forming apparatus 10 according to the present exemplary embodiment is a full-color printer for commercial printing, for which high image quality is required. Thus, to suppress an influence of bending of the base 42 on image quality, a metal block having higher rigidity than a sheet metal is used.

The base 42 is made of, for example, steel or stainless steel. The base 42 may be formed of a block of metal other than steel and stainless steel. For example, aluminum, which is higher in thermal conductivity and lighter than steel or stainless steel, may be used. In the present exemplary embodiment, however, the heat generated in a light source 64 is dissipated by, mainly, a support 60. Therefore, giving priority to rigidity rather than thermal conductivity and weight, steel or stainless steel is used in the base 42.

The thickness of the base 42 in the up-down direction (arrow-Y direction) may be larger than the thickness of the support 60 that forms the light emitting unit 44. Consequently, the rigidity (bending rigidity in the arrow-Y direction) of the base 42 may be higher than the rigidity of the light emitting unit 44. The thickness of the base 42 in the up-down direction (arrow-Y direction) may be preferably 5 mm or more, more preferably 10 mm or more, and further more preferably 20 mm or more.

As illustrated in FIG. 6, a recess-shaped portion 82 notched toward the spacers 56, in other words, toward the recessed portion 80 is formed on a rear surface 42B of the base 42 opposite to the front surface 42a. The recess-shaped portion 82 is provided at each position corresponding to the recessed portion 80 of the base 42. The recess-shaped portion 82 is formed in an oblique direction to extend from the rear surface 42B of the base 42 toward a central portion of the base 42 in the short direction (X-direction). For example, the recess-shaped portion 82 has a circular shape as viewed from the rear surface 42B of the base 42. The inner diameter of the recess-shaped portion 82 is larger than the outer shape of a head portion 58A of the fastening member 58. A bottom surface 82A of the recess-shaped portion 82 is provided with a through hole 84 through which a shaft portion 58B of the fastening member 58 extends through the base 42. The through hole 84 opens in the inclined surface 80A of the recessed portion 80.

Light Emitting Unit 44

As illustrated in FIG. 2 to FIG. 7, the three light emitting units 44 are configured similarly as described above. In one example, the two light emitting units 44 on one side of the base 42 in the short direction (arrow-X direction) and the one light emitting unit 44 on the other side of the base 42 in the short direction (arrow-X direction) are disposed symmetrically in the short direction (arrow-X direction) of the base 42.

As illustrated in FIG. 6, the light emitting units 44 each include the support 60 that extends in one direction (arrow-Z direction) and a light-emitting-element substrate 62 that is supported on the front surface side of the support 60. The front surface of the support 60 is a surface (surface on the upper side in the up-down direction in the present exemplary embodiment) on the opposite side of the base 42 in the up-down direction (arrow-Y direction). The light-emitting-element substrate 62 is provided with plural light sources 64 that are disposed in one direction (arrow-Z direction). In the present exemplary embodiment, the light sources 64 are configurated, for example, to include plural light emitting elements. In one example, each light source 64 is a light-emitting-element array that has a semiconductor substrate and plural light emitting elements formed in one direction on the semiconductor substrate. In the present exemplary embodiment, light-emitting-element arrays, which are the light sources 64, are disposed alternately in one direction on the light-emitting-element substrate 62. Each of the light sources 64 may be a single light emitting element instead of a light-emitting-element array. Each light emitting element is formed of a light emitting diode, a light emitting thyristor, a laser element, and the like. In one example, the light emitting element has a resolution of 2400 dpi in a state of being disposed in one direction. The light-emitting-element substrate 62 is a substrate for causing any one or more of the plural light sources 64 to emit light. In FIG. 6, only one light source 64 provided at each light emitting unit 44 is illustrated, and the other light sources, that are disposed in one direction, are not illustrated.

Each of the light emitting units 44 includes a pair of attachment portions 66 that are provided on a surface of the light-emitting-element substrate 62 on the opposite side of the support 60, and the lens portion 68 that is held in a state of being interposed between upper end portions of the pair of attachment portions 66. The lens portion 68 is one example of a light emission portion through which light from the plural light sources 64 is emitted.

The pair of attachment portions 66 and the lens portion 68 extend in one direction (arrow-Z direction) of the support 60 (refer to FIG. 4, etc.). The lens portion 68 is disposed at a position facing the plural light sources 64 with a space between the lens portion 68 and the plural light sources 64. In the exposure device 40, the light emitted from the plural light sources 64 passes through the lens portion 68 and is radiated to the surface of the photoreceptor drum 32 (refer to FIG. 1), which is an object to be radiated.

The support 60 is formed of a rectangular parallelepiped member. In the present exemplary embodiment, the support 60 is formed of a metal block similarly to the base 42. For example, the support 60 is made of steel or stainless steel. The base 42 may be formed of a block of metal other than steel and stainless steel. For example, the metal block may be made of aluminum, which is high in thermal conductivity and lighter than steel or stainless steel. However, if the thermal expansion coefficient is different between the base 42 and the support 60, distortion or bending may be generated. Therefore, from the point of view of suppressing distortion and bending, the base 42 and the support 60 may be made of the same material.

The surface of the support 60 on the side of the base 42 has a screw hole 74 to which the shaft portion 58B of the fastening member 58 is fastened (refer to FIG. 6). The screw hole 74 is provided at a position facing the through hole 84 of the base 42.

In a state in which the fastening member 58 is inserted into the inside of the recess-shaped portion 82 of the base 42 and in which the shaft portion 58B of the fastening member 58 extends through the through hole 84 of the base 42, the shaft portion 58B of the fastening member 58 is fastened to the screw hole 74 of the support 60 via the spacers 56. Consequently, the light emitting unit 44 is fixed to the base 42 by the fastening member 58 from the inside of the recess-shaped portion 82 of the base 42. In a state in which the light emitting unit 44 is fixed to the base 42 by the fastening member 58, the spacers 56 are interposed between the base 42 and the support 60.

Here, a method of fixing with respect to the front side of the base 42 by using the fastening member 58 from the front side (emission surface side) of the support 60 may be considered. The support 60 according to the present exemplary embodiment is, however, formed of a metal block having a heavy mass differently from a support of a resin material and a support formed of a sheet metal. Therefore, the fastening member 58 may have a size corresponding to the mass. In this case, a space for the fastening member 58 having a large size may be present on the front side of the support 60, which may increase the size of the support 60. Thus, the configuration in which fastening is performed from the rear surface side of the support 60 is employed in the present exemplary embodiment.

It may be difficult to employ a configuration in which fastening is performed from the front side of the support 60 in a configuration in which the fastening member 58 is provided not only at both ends of the support 60 but also at a central portion thereof since the light sources 64 are present on the central portion. Thus, by employing the configuration in which fastening is performed from the rear side of the base 42, fastening may be simply performed from the rear side of the base 42 in the configuration in which the both ends and the central portion of the support 60 are fastened.

The screw hole 74 and the recess-shaped portion 82 of the base 42 are provided at positions overlapping the light sources 64 as viewed in the optical axis direction of the light sources 64. Due to this configuration, the heat generated by the light sources 64 may easily escape to the base 42 via the fastening member 58 compared with a case in which the screw hole 74 and the recess-shaped portion 82 are provided at positions not overlapping the light sources 64.

As illustrated in FIG. 6, FIG. 7, FIG. 9, and FIG. 10, in the light emitting unit 44, a driving substrate 72 is attached to the support 60 via a fastener 70. The driving substrate 72 is one example of a substrate. The driving substrate 72 extends in one direction (arrow-Z direction). The length of the driving substrate 72 in the one direction is shorter than the length of the support 60 in the one direction (refer to FIG. 9). The driving substrate 72 is a substrate for driving the light emitting units 44. For example, an application specific integrated circuit (ASIC) substrate or the like is used as the driving substrate 72.

Figure 10:
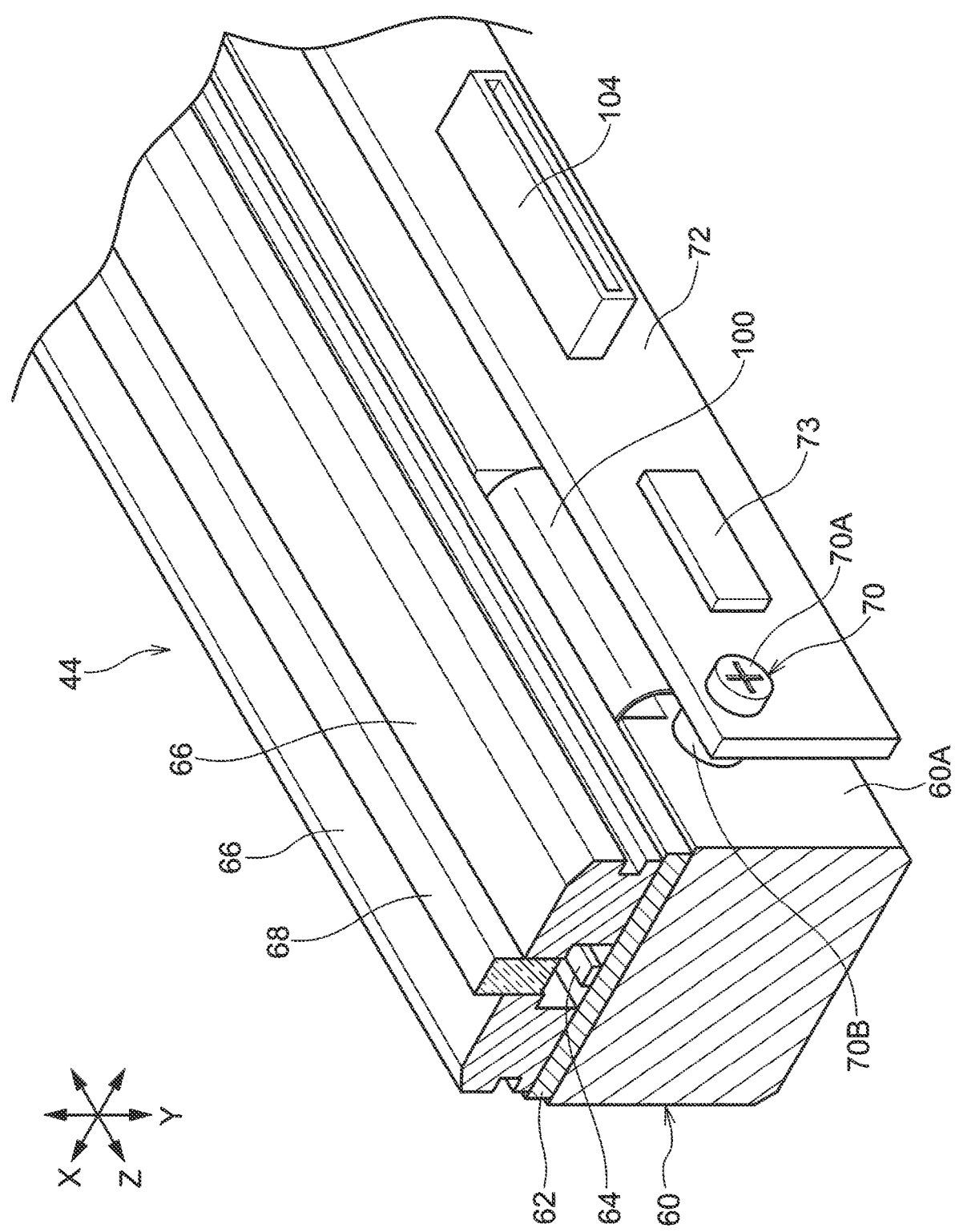
FIG. 10 is a perspective view of a portion of the light emitting unit cut in the short direction.

The fastener 70 includes a fastening bolt 70A and a pipe body 70B that is disposed between the support 60 and the driving substrate 72 (refer to FIG. 10). In one example, the pipe body 70B is made of a metal and joined to the driving substrate 72 by soldering or the like. Although not illustrated, the driving substrate 72 has an opening continuous with a through hole of the pipe body 70B. A shaft portion of the fastening bolt 70A is configured to extend through a pipe body 60B. The shaft portion of the fastening bolt 70A extends through the pipe body 70B from the side of the driving substrate 72 to be fastened to the support 60, and the driving substrate 72 is thereby attached to the support 60. The driving substrate 72 is attached to the support 60 by two fasteners 70 disposed at both end portions of the driving substrate 72 in one direction.

In the short direction (arrow-X direction) of the base 42, a surface (that is, a plate surface) of the driving substrate 72 is disposed along an inner side portion 60A of the support 60 in the short direction (refer to FIG. 7). The inner side portion 60A of the support 60 refers to a side close to a central portion of the base 42 in the short direction.

Between the inner side portion 60A of the support 60 and the surface (plate surface) of the driving substrate 72, a gap is formed by the pipe bodies 70B of the fasteners 70. In other words, the driving substrate 72 is attached in a state of being not in direct contact with the inner side portion 60A of the support 60 in the light emitting unit 44 by the fasteners 70.

The inner side portion 60A of the support 60 is an inclined surface that is inclined inward with respect to the front surface 42a of the base 42. The plate surface of the driving substrate 72 is also inclined inward similarly to the inner side portion 60A with respect to the front surface 42a of the base 42.

The driving substrate 72 is provided at the inner side portion 60A of each of respective supports 60 of the three light emitting units 44.

As illustrated in FIG. 3 and FIG. 4, in a side view, the driving substrate 72 provided in one light emitting unit 44 is provided at a position that does not overlap the other light emitting units 44 adjacent to the one light emitting unit 44. The length in one direction (arrow-Z direction) is common to the driving substrates 72 disposed at a respective one of the three light emitting units 44 on the base 42 and is shorter than, of the length of the light emitting unit 44 disposed at a central portion in one direction, a length of a part that does not overlap the light emitting units 44 on the both sides thereof in the one direction.

Figure 9:
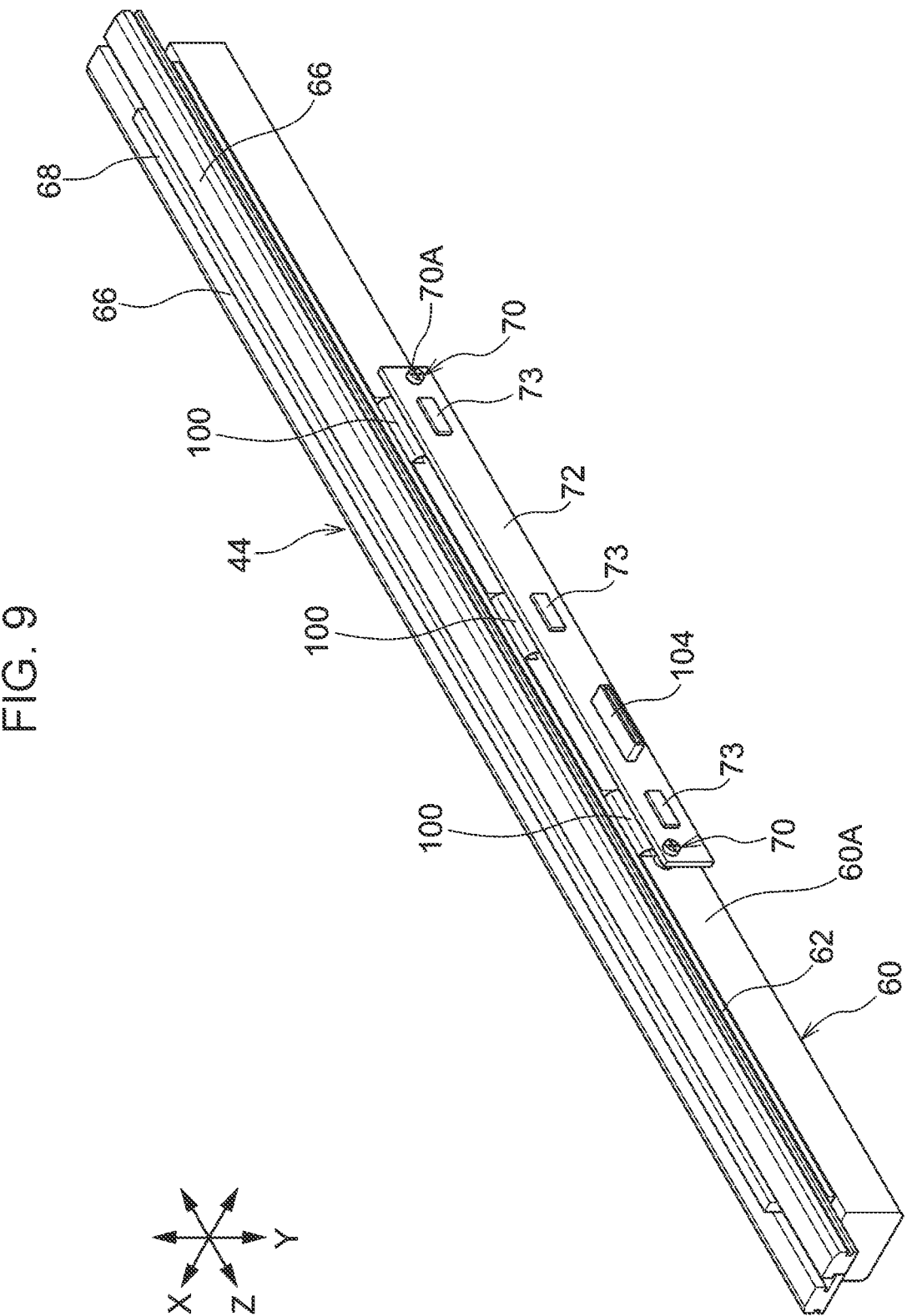
FIG. 9 is a perspective view of a light emitting unit of the exposure device.

As illustrated in FIG. 7, FIG. 9, and FIG. 10, three flexible cables 100 are connected to the light-emitting-element substrate 62 on the upper side of the support 60. The three flexible cables 100 each extend from an upper portion of the inner side portion 60A of the support 60 to the outside of the support 60. The three flexible cables 100 extending to the outside of the support 60 are electrically connected to a respective one of three driving elements 73 provided at the driving substrate 72. As the driving elements 73, for example, integrated circuits or the like are used. The driving elements 73 are one example of a heat generating element.

An intermediate portion of the driving substrate 72 in one direction (arrow-Z direction) is provided with a connector 104 to which a flat cable 102 from the outside of the light emitting unit 44 is electrically connected. A connection port of the connector 104 is disposed in a direction intersecting the surface (plate surface) of the driving substrate 72. A connection portion of the flat cable 102 is insertable into and extractable from the connector 104 in the direction intersecting the surface (plate surface) of the driving substrate 72.

As illustrated in FIG. 7, the flat cable 102 connected to the connector 104 extends from the driving substrate 72 to a side opposite to the support 60. A through portion 106 that extends through the base 42 in the up-down direction (arrow-Y direction) is formed at a position corresponding to a position at which the flat cable 102 is connected to the driving substrate 72. In the short direction (arrow-X direction) of the base 42, the through portion 106 is provided, on a side of the driving substrate 72 in the base 42, at a position on the opposite side of the light emitting unit 44 that includes the driving substrate 72 (that is, at a position at which the light emitting unit 44 is not disposed). The flat cable 102 is inserted into the through portion 106 of the base 42 and thereby extends in the inside of the lower covering 50 on the rear surface 42B side of the base 42.

As illustrated in FIG. 4 and FIG. 5, the flat cable 102 is connected via the connector 104 to each of the driving substrates 72 provided at the three light emitting units 44 corresponding thereto. In the base 42, the through portion 106 is provided on the side of the driving substrate 72 of each of the three light emitting units 44. The flat cable 102 of each of the three light emitting units 44 is inserted into the through portion 106 of the base 42 and thereby extends in the inside of the lower covering 50 on the rear surface 42B side of the base 42 (refer to FIG. 7).

Spacer 56

As illustrated in FIG. 6, the spacers 56 are interposed between the base 42 and the light emitting units 44 in the optical axis direction of the light sources 64. In one example, each spacer 56 has a plate shape and is formed of one member (that is, a single member). In the present exemplary embodiment, the spacer 56 has a U-shape as viewed in the optical axis direction of the light sources 64. The spacer 56 includes a body portion 56A and a depressed portion 56B notched from one side of the body portion 56A.

The spacer 56 is disposed on the inclined surface 80A of the recessed portion 80 of the base 42. At a position at which the spacer 56 is disposed on the inclined surface 80A, the thickness of the spacer 56 is equal to or more than the depth of the recessed portion 80. In a form in which a compression load is applied to the spacer 56, the fastening member 58 fixes the light emitting unit 44 to the base 42.

Bracket 48

As illustrated in FIG. 7, each bracket 48 includes a U-shaped support 48A that protrudes from the rear surface 42B of the base 42 toward a side opposite to the light emitting units 44, and a pair of attachment portions 48B that are bent inward (that is, toward the inner side of the base 42 in the short direction) from an upper end portion of the support 48A. The support 48A includes, at an intermediate portion on the lower side of the U-shape, a flat portion 49 that faces the rear surface 42B of the base 42. The support 48A has a shape that opens at a side opposite to the flat portion 49 toward the base 42. The pair of attachment portions 48B are each attached in a state of being in surface contact with the rear surface 42B of the base 42 to the base 42 by a fastening member 110.

Plural brackets 48 are provided at intervals in one direction (arrow-Z direction) of the base 42 (refer to FIG. 5). At the flat portion 49 of the support 48A, the flat cable 102 is held. By being supported by the plural brackets 48, the flat cable 102 is disposed in one direction (arrow-Z direction) of the base 42 in the inside of the lower covering 50.

Lower Covering 50

As illustrated in FIG. 4 and FIG. 7, the lower covering 50 covers the harnesses 46 and the flat cables 102 that are electrically connected to the three light emitting units 44 corresponding thereto. The lower covering 50 is attached to the lower side (that is, the rear surface 42B side of the base 42 illustrated in FIG. 5) of the base 42 in the up-down direction to protrude from the base 42 to a side opposite to the light emitting units 44 and cover a portion of the rear surface 42B of the base 42. In the present exemplary embodiment, the lower covering 50 has a U-shaped cross-section, and an upper end portion of the lower covering 50 is attached to both sides of the base 42 in the short direction (arrow-X direction) by plural fastening members 86.

Side Covering 52

As illustrated in FIG. 2, FIG. 6, and FIG. 7, the side covering 52 is provided at each of both end portions of the base 42 in the short direction (arrow-X direction). The side covering 52 is disposed adjacent to the three light emitting units 44 in one direction (arrow-Z direction). Consequently, the side covering 52 has a function of protecting the three light emitting units 44 from the outer side.

The side covering 52 is provided at a position overlapping the three light emitting units 44 in a side view (as viewed in the arrow-X direction) of the exposure device 40. The length of the side covering 52 in one direction (arrow-Z direction) is longer than the longitudinal region in which the three light emitting units 44 are disposed in the base 42 (refer to FIG. 2 and FIG. 3).

As illustrated in FIG. 7, on the inner side of the side covering 52, a support portion 122 that supports the side covering 52 is provided. The front surface 42a of the base 42 is provided with an attachment portion 120 at an end portion in the short direction (arrow-X direction). The attachment portion 120 supports the support portion 122. The support portion 122 is in contact at one side in the width direction with the support 60 and in contact at the other side in the width direction with the inner surface of the side covering 52. By being in contact with the side covering 52, the support portion 122 has a function of supporting and suppressing the side covering 52 from falling toward the light emitting units 44. The support portion 122 is provided at each of the side coverings 52 on the both sides of the base 42 in the short direction. Although not illustrated, plural support portions 122 are provided at intervals in one direction (arrow-Z direction) of the side covering 52.

Air Supply Device 130

Figure 8:
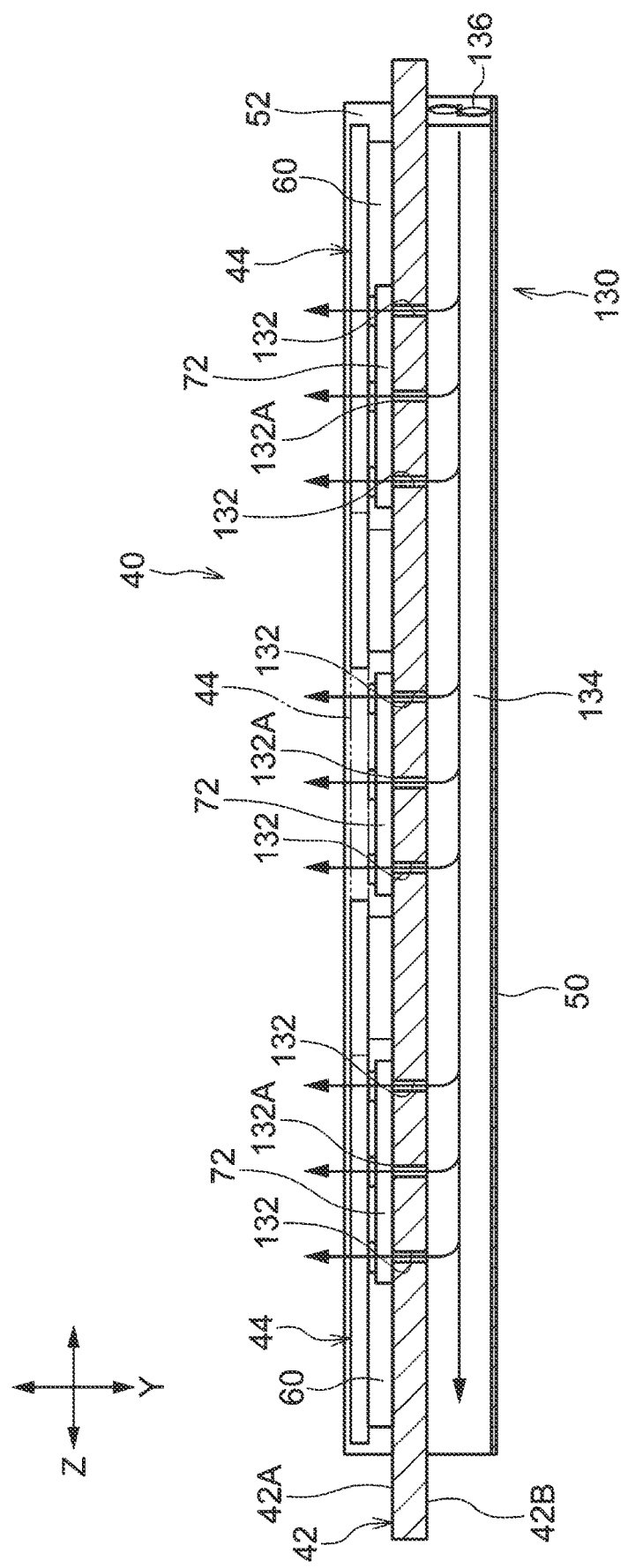
FIG. 8 is a sectional view of an air supply device of the exposure device cut in the longitudinal direction of a base.

As illustrated in FIG. 7 and FIG. 8, the air supply device 130 includes a supply path 132 for supplying air to the front surface 42a side of the base 42. The air supply device 130 also includes the lower covering 50 that is attached to an end portion of the base 42 on a side opposite (that is, the rear surface 42B side) to the light emitting units 44 and that has a flow path 134 in which air flows. The air supply device 130 further includes a fan 136 that is disposed at one end portion in one direction (arrow-Z direction) of the lower covering 50. The air supply device 130 is one example of an air blowing unit that blows air toward the light emitting units 44.

In one example, the supply path 132 is a through hole that extends through the base 42 in the up-down direction (arrow-Y direction). The upper end of the supply path 132 is provided with an opening 132A that opens in the front surface 42a of the base 42. In one example, the light emitting unit 44 is disposed on the upper side of the base 42 in the up-down direction (arrow-Y direction), and the supply path 132 is configured to cause air to flow from a lower portion to an upper portion of the base 42. In other words, the supply path 132 supplies air from the rear surface 42B side of the base 42 to the front surface 42a side where the light emitting unit 44 is disposed.

Plural supply paths 132 are provided in one direction (arrow-Z direction) of the light emitting unit 44. In the present exemplary embodiment, the three supply paths 132 are provided with respect to one light emitting unit 44 at intervals in one direction (arrow-Z direction) of the light emitting unit 44.

In one example, the supply path 132 is provided at a position corresponding to the driving substrate 72 attached to the inner side portion 60A of the support 60 in the light emitting unit 44. In other words, the opening 132A of the supply path 132 is disposed on the lower side of the driving substrate 72 in the up-down direction (arrow-Y direction) (refer to FIG. 7). In one example, the supply path 132 and the opening 132A are a hole elongated in one direction of the base 42.

In one example, the openings 132A of the three supply paths 132 face a corresponding one of the three driving elements 73 provided at the driving substrate 72. In other words, the openings 132A of the three supply paths 132 are disposed on the lower side of the three driving elements 73, provided at the driving substrate 72, in the up-down direction (arrow-Y direction) (refer to FIG. 4 and FIG. 5). Consequently, air is blown from the openings 132A of the supply paths 132 toward the driving elements 73 of the driving substrate 72.

Among the three light emitting units 44, the light emitting units 44 at the both end portions of the base 42 in one direction (arrow-Z direction) and the light emitting unit 44 at the central portion of the base 42 in the one direction (arrow-Z direction) are disposed to be displaced from each other in the width direction intersecting the one direction (arrow-Z direction) of the base 42. In other words, as described above, the three light emitting units 44 are disposed at the base 42 in a staggered form in a plan view. The openings 132A of the supply paths 132 are provided on the inner side of the base 42 from respective light emitting units 44 in the short direction (width direction) (refer to FIG. 3). In the present exemplary embodiment, the three openings 132A corresponding to a respective one of the light emitting units 44 on the base 42 are disposed in a staggered form in a plan view.

In the present exemplary embodiment, the inner side portion 60A of the support 60 in each light emitting unit 44 is inclined inward with respect to the front surface 42a of the base 42. The driving substrate 72 is disposed along the inner side portion 60A and is thereby inclined inward with respect to the front surface 42a of the base 42. Consequently, air is blown from the opening 132A of the supply path 132 to the driving substrate 72 inclined inward with respect to the front surface 42a of the base 42.

As described above, the lower covering 50 has the U-shaped cross-section in the short direction of the base 42, and the upper end portion of the lower covering 50 is attached to the side surface of the base 42 by the fastening members 86. The lower covering 50 covers the rear surface 42B side of the base 42 and is disposed in one direction (arrow-Z direction) of the base 42. The flow path 134 in the inside of the lower covering 50 is provided in one direction (arrow-Z direction) of the base 42, and air is supplied from the flow path 134 to the plural supply paths 132 of the base 42.

As illustrated in FIG. 7, in the inside of the lower covering 50, the flat cables 102 connected to the light emitting units 44 corresponding thereto are disposed in one direction (arrow-Z direction) of the base 42. The lower covering 50 is also used as a covering that covers the flat cables 102. In FIG. 8, the flat cables 102 are omitted.

The fan 136 rotates to thereby introduce air to the flow path 134 in the inside of the lower covering 50. By the rotation of the fan 136, the air is supplied in one direction (arrow-Z direction) of the flow path 134.

In the air supply device 130, the air is introduced to the flow path 134 in the inside of the lower covering 50 by the rotation of the fan 136. The air then flows in the flow path 134 of the lower covering 50 in one direction (arrow-Z direction) toward an end portion on a side opposite to the fan 136. A part of air that flows in the one direction (arrow-Z direction) of the base 42, is supplied to the plural supply paths 132 of the base 42. The air is then blown from the openings 132A of the supply paths 132 toward the driving substrates 72 of the light emitting units 44.

Cleaning Device 54

As illustrated in FIG. 7, the cleaning device 54 includes a belt-shaped cleaning portion 126 that cleans an upper surface 68A of the lens portion 68 (refer to FIG. 2). The cleaning device 54 is one example of a cleaning mechanism. The cleaning portion 126 is disposed in a direction intersecting the lens portion 68. The cleaning device 54 also includes a shaft 128 that is coupled to the cleaning portion 126 by a coupling member (not illustrated) and that moves the cleaning portion 126 in one direction (arrow-Z direction) of the lens portion 68. Some of the plural support portions 122 are each provided with a hole portion 123 into which the shaft 128 is inserted. The support portions 122 function as a guide portion that guides the shaft 128.

The shaft 128, the support portions 122, and the attachment portion 120 are provided on a side opposite to the opening 132A with respect to the light emitting unit 44. The shaft 128, the support portions 122, and the attachment portion 120 forming the cleaning device 54 are one example of the cleaning mechanism.

Actions and Effects

Next, actions and effects according to the present exemplary embodiment will be described.

The exposure device 40 is provided with the base 42 formed of the metal block that extends in one direction (arrow-Z direction), and the three light emitting units 44 in each of which the plural light sources 64 (refer to FIG. 6) disposed in the one direction are supported by the support 60 extending in the one direction.

In the exposure device 40, the base 42 is disposed over the entire length of the photoreceptor drum 32 in the axial direction. The three light emitting units 44 are disposed to be displaced from each other in one direction of the base 42, and any one or more of the three light emitting units 44 face a region provided with the photoreceptor in the axial direction of the photoreceptor drum 32. In the exposure device 40, light from the light emitting units 44 is radiated to the photoreceptor drum 32, thereby forming an electrostatic latent image in the region provided with the photoreceptor of the photoreceptor drum 32.

In the aforementioned exposure device 40, the three light emitting units 44 are disposed at the base 42 to be displaced from each other in one direction (arrow-Z direction), and the length of the base 42 in the one direction (arrow-Z direction) is longer than the length of the single light emitting unit 44 in the one direction (arrow-Z direction).

In a configuration in which plural light emitting units are disposed at a base to be displaced from each other in one direction as described above, an amount of heat generated by a driving substrate provided at each of the plural light emitting units is increased, and expansion of components due to the heat may cause degradation in image quality.

The exposure device 40 according to the present exemplary embodiment is provided with the air supply device 130 that blows air toward the light emitting units 44 through the openings 132A provided in the base 42. Therefore, in the exposure device 40, the dimension of each light emitting device in the width direction may be reduced compared with a case in which the air blowing unit is disposed on the outer side of the base in the width direction.

In the exposure device 40, the air supply device 130 is configured to cause air to flow through the supply paths 132 from the rear surface 42B side of the base 42 toward the front surface 42a side where the light emitting units 44 are disposed. Therefore, in the exposure device 40, the dimension of the exposure device 40 in the width direction may be reduced compared with a configuration that causes air to flow from a side toward the front surface side of the base.

In the exposure device 40, plural openings 132A are provided in one direction of the light emitting units 44. Therefore, in the exposure device 40, the light emitting units may be uniformly cooled compared with a case in which a single opening is provided.

In addition, in the exposure device 40, each light emitting unit 44 is provided with the lens portion 68 through which light from the plural light sources 64 is emitted, and the shaft 128, the support portions 122, and the like forming the cleaning device 54 for cleaning the lens portion 68 are provided on a side opposite to the openings with respect to the light emitting unit 44. Therefore, in the exposure device 40, the flow of air may be not easily blocked by the shaft 128, the support portions 122, and the like forming the cleaning device 54.

In addition, in the exposure device 40, the driving substrate 72 is provided at the side portion of the light emitting unit 44, and the opening 132A is provided at a position corresponding to the driving substrate 72 of the base 42. Therefore, in the exposure device 40, the driving substrate 72 may be easily cooled compared with a case in which the opening is present at a position displaced from the base.

In addition, in the exposure device 40, the opening 132A is provided at a position corresponding to the driving elements 73 of the driving substrate 72. Therefore, in the exposure device 40, the driving elements 73 may be easily cooled compared with a case in which the opening is present at a position displaced from the heat generating element of the substrate.

In the exposure device 40, the three light emitting units 44 are disposed to be displaced from each other in the width direction intersecting the one direction of the base 42, and the openings 132A are provided on the inner side of the base 42 in the short direction (that is, the width direction) from the light emitting units 44. Therefore, in the exposure device 40, the dimension of the base 42 in the width direction may be reduced compared with a case in which the openings are provided on the outer side of the base in the width direction from the light emitting units.

In addition, in the exposure device 40, the dimension of the base 42 in the width direction may be reduced in the configuration in which the three light emitting units 44 are disposed at the base 42 in the staggered form in a plan view, compared with a case in which the openings are provided on the outer side of the base in the width direction from the light emitting units.

In the exposure device 40, the inner side portions 60A of the three light emitting units 44 in the width direction of the base 42 are inclined inward with respect to the front surface 42a of the base 42. Therefore, in the exposure device 40, air may be blown to the three light emitting units 44 efficiently compared with a case in which the inner side portions of the plural light emitting units are disposed vertically with respect to the surface of the base.

In the exposure device 40, the plural openings 132A are provided in one direction of the base 42, and the flow path 134 for supplying air to the plural openings 132A is provided in one direction of the base 42. Therefore, in the exposure device 40, air may be supplied to the plural openings 132A efficiently compared with a case in which air is supplied to each of the plural openings via flow paths that differ from each other.

In the exposure device 40, the base 42 is formed of a metal block. Therefore, in the exposure device 40, heat may be favorably dissipated from the three light emitting units 44 compared with a case in which the base is a sheet metal.

In the exposure device 40, the support 60 of each light emitting unit 44 is formed of a metal block. Therefore, in the exposure device 40, heat may be favorably dissipated from the three light emitting units 44 compared with a case in which the support is a resin.

In the exposure device 40, heat may be favorably dissipated from the three light emitting units 44 in the configuration including the light-emitting-element substrate 62 on the front surface side (that is, the side opposite to the base 42) of the support 60, compared with a case in which the support is a resin.

The image forming apparatus 10 is provided with the exposure device 40 and the photoreceptor drum 32 that moves relatively to the exposure device 40 in a direction intersecting one direction (arrow-Z direction) and to which light from the exposure device 40 is to be radiated. The surface of the photoreceptor drum 32 is provided with the region in which the photosensitive material is disposed. Therefore, in the image forming apparatus 10, the size of the entirety of the image forming apparatus 10 including the exposure device 40 may be reduced compared with a case in which the air blowing unit is disposed on the outer side of the base in the width direction.

In the image forming apparatus 10, the region in which the photosensitive material is disposed is provided on the surface of the photoreceptor drum 32, which is a cylindrical member that rotates in the circumferential direction. Therefore, in the image forming apparatus 10, the size of the entirety of the image forming apparatus 10 including the exposure device 40 may be reduced in the configuration including the photoreceptor drum 32.

In the aforementioned exposure device 40, each light emitting unit 44 may be disposed above the base 42, and the air supply device 130 may be configured to cause air to flow through the supply path 132 from a lower portion to an upper portion of the base 42. In one example, such a disposition of the exposure device 40 is achieved by disposing the photoreceptor drum 32 on the upper side of the exposure device 40. Consequently, in the exposure device 40, a powder body, such as tonner, diffused around the exposure device 40 may be suppressed from entering the exposure device 40 compared with a configuration that causes air to flow from an upper portion toward a lower portion of the base.

Second Exemplary Embodiment

Next, an exposure device according to a second exemplary embodiment will be described. When the second exemplary embodiment includes components, members, and the like identical to those in the first exemplary embodiment, detailed description thereof is omitted by giving identical signs thereto, and differences will be described mainly.

Figure 11:
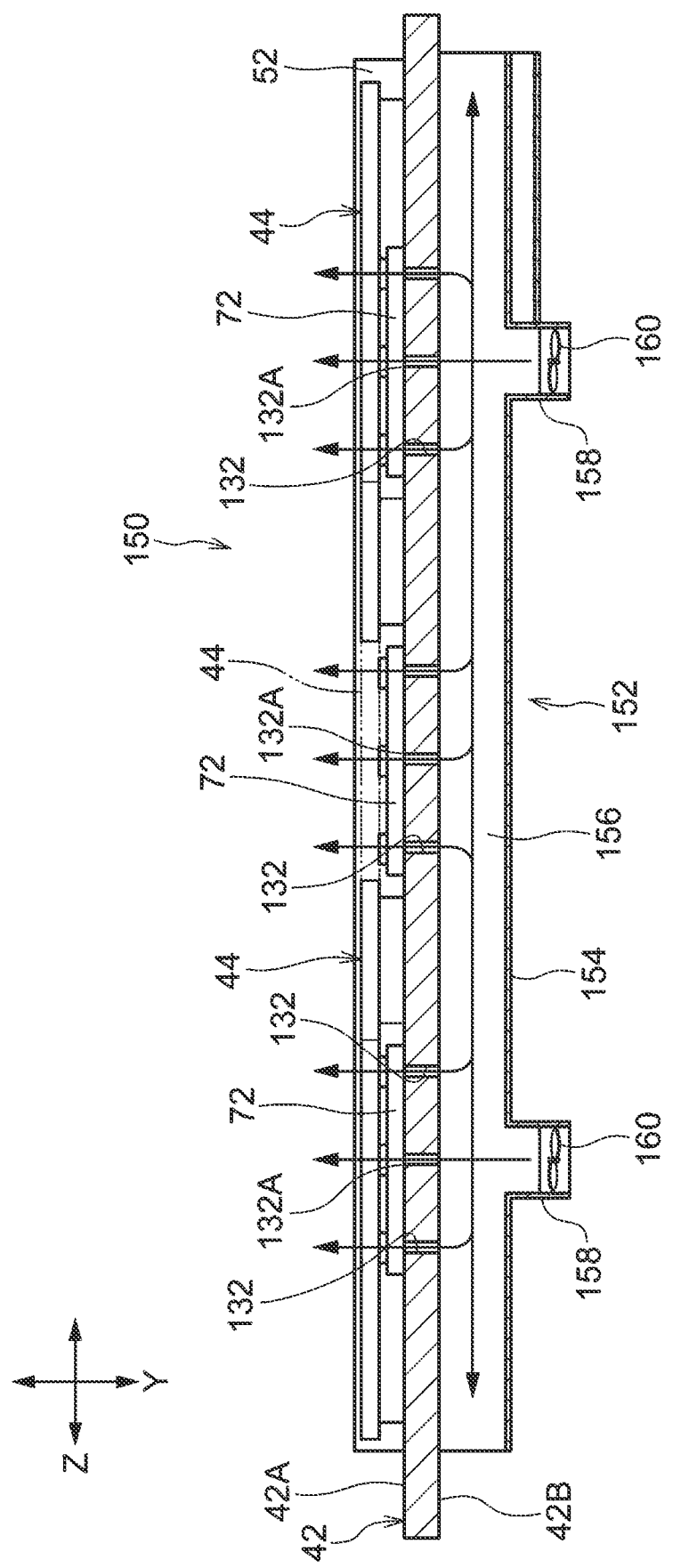
FIG. 11 is a sectional view of an air supply device of an exposure device according to a second exemplary embodiment, the air supply device being cut in the longitudinal direction of a base.

FIG. 11 illustrates an exposure device 150 according to the second exemplary embodiment. The exposure device 150 includes an air supply device 152 as one example of an air blowing unit. In the exposure device 150, the air supply device 152 is simply changed, and the other configurations are the same as those in the exposure device 40 according to the first exemplary embodiment.

The air supply device 152 includes a lower covering 154 that is attached to an end portion of the base 42 on a side opposite to the light emitting units 44 and that has, in the inside thereof, a flow path 156 in which air flows. The lower covering 154 has a U-shaped cross-section in the short direction of the base 42, and an upper end portion of the lower covering 154 is attached to a side surface of the base 42 by a fastening member (not illustrated). The lower covering 154 covers the rear surface 42B side of the base 42 and is disposed in one direction (arrow-Z direction) of the base 42.

The air supply device 152 includes a cylindrical portion 158 that is disposed at each of both end portions of the lower covering 154 in one direction (arrow-Z direction) and that extends downward, and a fan 160 that is provided at a lower end portion of the cylindrical portion 158.

Although not illustrated, in the inside of the lower covering 154, flat cables connected to a corresponding one of the light emitting units 44 are disposed in one direction (arrow-Z direction) of the base 42. The lower covering 154 is also used as a covering that covers the flat cables.

In the air supply device 152, air is introduced to the flow path 156 in the inside of the lower covering 154 from the cylindrical portion 158 by the rotation of the fan 160. Due to the two fans 160, the air is divided to both sides of the lower covering 154 from the two cylindrical portions 158 and flows in the flow path 156 of the lower covering 154 toward both end portions in one direction (arrow-Z direction). At this time, the air passes through the plural supply paths 132 of the base 42 and is blown toward the driving substrate 72 of each of the light emitting units 44.

The aforementioned exposure device 150 may obtain the same actions and the same effects due to the same configuration as the configuration of the exposure device 40 according to the first exemplary embodiment.

Third Exemplary Embodiment

Next, an exposure device according to a third exemplary embodiment will be described. When the third exemplary embodiment includes components, members, and the like identical to those in the first exemplary embodiment, detailed description thereof is omitted by giving identical signs thereto, and differences will be described mainly.

Figure 12:
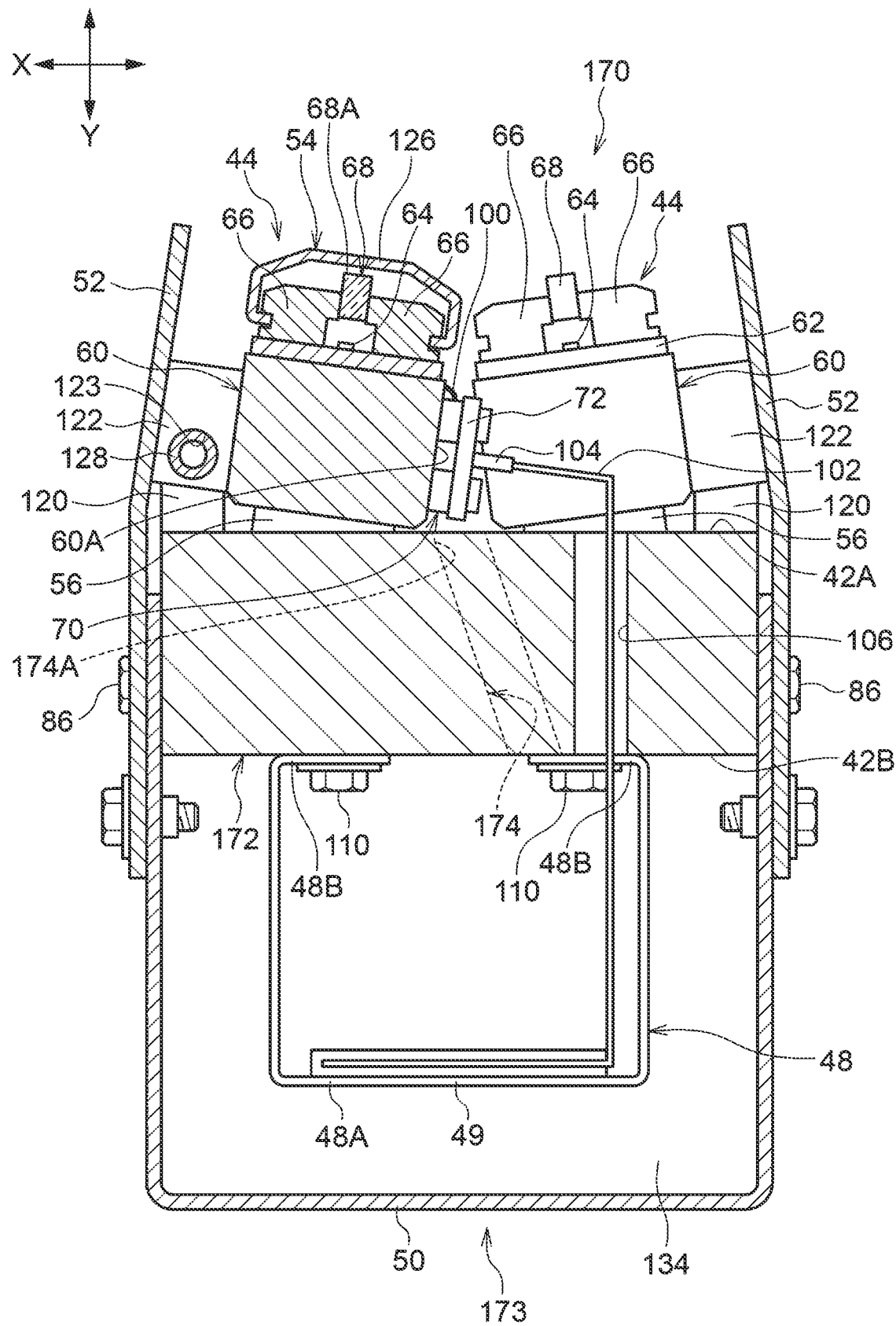
FIG. 12 is a sectional view of an air supply device of an exposure device according to a third exemplary embodiment, the air supply device being cut in the short direction of a base.

FIG. 12 illustrates an exposure device 170 according to the third exemplary embodiment. The exposure device 170 includes a base 172 and an air supply device 173 as one example of an air blowing unit. In the exposure device 170, the base 172 and the air supply device 173 are simply changed, and the other configurations are the same as those of the exposure device 40 according to the first exemplary embodiment.

As illustrated in FIG. 12, the exposure device 170 includes a supply path 174 that extends through the base 172 in an oblique direction with respect to the front surface 42a of the base 172. The upper end of the supply path 174 is provided with an opening 174A that opens in the front surface 42a of the base 172. Through the opening 174A, air is blown toward the light emitting units 44 in the oblique direction with respect to the surface of the base 172.

In the present exemplary embodiment, the supply path 174 has a configuration in which air is supplied in an oblique direction from the outer side toward the inner side in the short direction (that is, the width direction) of the base 172. In other words, the supply path 174 has a linear shape in the sectional view illustrated in FIG. 12, and the lower end of the supply path 174 opening in the rear surface 42B of the supply path 174 is disposed on the outer side in the short direction (that is, the width direction) of the base 172. The opening 174A of the supply path 174 opening in the front surface 42a of the supply path 174 is disposed on the inner side in the short direction (that is, the width direction) of the base 172. The opening 174A of the supply path 174 is disposed on the lower side in the up-down direction of the driving substrate 72 attached to the inner side portion 60A of the support 60 of the light emitting unit 44.

In the present exemplary embodiment, the inner side portion 60A of the support 60 is an inclined surface that is inclined inward with respect to the front surface 42a of the base 42. The plate surface of the driving substrate 72 is also inclined inward similarly to the inner side portion 60A with respect to the front surface 42a of the base 42. Consequently, air is blown from the opening 174A of the supply path 174 in the oblique direction to the driving substrate 72 inclined inward with respect to the front surface 42a of the base 42.

Although not illustrated, three supply paths 174 are disposed at intervals in one direction in each of the three light emitting units 44.

The aforementioned exposure device 170 may have the following actions and effects in addition to actions and effects due to the same configuration as that of the exposure device 40 according to the first exemplary embodiment.

In the exposure device 170, air, that has passed through the opening 174A, is blown toward the light emitting units 44 in a direction oblique to the front surface 42a of the base 172. Therefore, in the exposure device 170, the light emitting units 44 may be easily cooled compared with a case in which the opening is formed perpendicular to the surface of the base. In addition, in the exposure device 170, air is blown in an oblique direction to the driving substrate 72 inclined inward with respect to the front surface 42a of the base 42 through the opening 174A of the supply path 174. Therefore, in the exposure device 170, air may easily hit the plate surface of the driving substrate 72 compared with a case in which the driving substrate is disposed in the vertical direction.

Fourth Exemplary Embodiment

Figure 13:
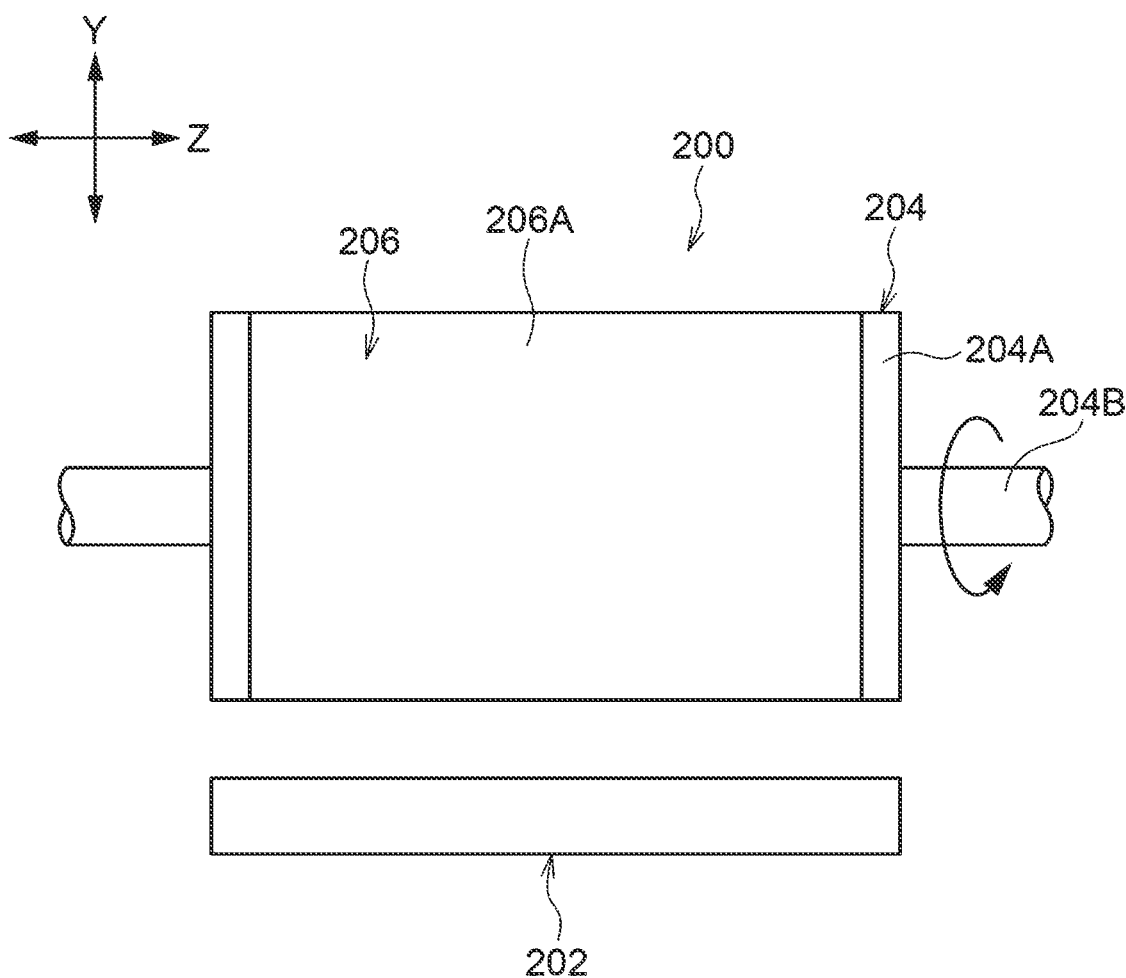
FIG. 13 illustrates a drawing apparatus that includes a light emitting device according to a fourth exemplary embodiment.

FIG. 13 illustrates a drawing apparatus 200 that includes a light emitting device 202 according to a fourth exemplary embodiment. Description of configuration parts identical to those in the first exemplary embodiment described above is omitted by giving identical numerals thereto.

As illustrated in FIG. 13, the drawing apparatus 200 includes the light emitting device 202 and a cylindrical member 204 that is disposed in the longitudinal direction of the light emitting device 202 and that rotates in the circumferential direction.

The light emitting device 202 has the same configuration as that of the exposure device 40 according to the first exemplary embodiment.

The cylindrical member 204 includes a cylindrical portion 204A and a shaft portion 204B that extends on the both sides of the cylindrical portion 204A. The shaft portion 204B is rotatably supported by a frame (not illustrated). The cylindrical portion 204A is rotated in the circumferential direction by the rotation of the shaft portion 204B.

A substrate 206 is attached to a surface of the cylindrical portion 204A. The surface of the substrate 206 is provided with a region 206A in which a photosensitive material is disposed. In one example, the substrate 206 is a plate for computer-to-plate (CTP) to be used in a platemaking process in offset printing. In one example, the region 206A in which the photosensitive material is disposed is a region in which a photosensitive material such as a photoresist is applied.

In one example, the light emitting device 202 is disposed on the lower side in the up-down direction (arrow-Y direction) with respect to the cylindrical member 204. Light is radiated from a light emitting unit of the light emitting device 202 with respect to the substrate 206 on the upper side. Although not illustrated, in the light emitting device 202, the light emitting unit is disposed above a base, and an air blowing unit is configurated to cause air to flow upward from below the base.

In the drawing apparatus 200, while the cylindrical member 204 is rotated, light in a predetermined pattern is radiated from the light emitting device 202 to the region 206A of the substrate 206 in which the photosensitive material is disposed. Consequently, the predetermined pattern is drawn on the region 206A of the substrate 206 in which the photosensitive material is disposed. Thereafter, the substrate 206 is developed, thereby preparing a printing plate to be used in an offset printer. In one example, a laser element is usable as a light source of the drawing apparatus 200 in this case.

The aforementioned light emitting device 202 has the following actions and effects in addition to actions and effects due to the same configuration as that of the exposure device 40 according to the first exemplary embodiment.

According to the aforementioned light emitting device 202, the light emitting device 202 is disposed on the lower side in the up-down direction (arrow-Y direction) with respect to the cylindrical member 204. In the light emitting device 202, the light emitting unit is disposed above the base, and the air blowing unit is configurated to cause air to flow upward from below the base. Therefore, in the light emitting device 202, a powder body diffused around the light emitting device 202 may be suppressed from entering the light emitting device 202 compared with a configuration that causes air to flow downward from above the base.

In the drawing apparatus 200 that includes the aforementioned light emitting device 202, the size of the entirety of the drawing apparatus 200 including the light emitting device 202 may be reduced compared with a case in which the air blowing unit is disposed on the outer side of the base in the width direction.

In addition, according to the drawing apparatus 200, the size of the entirety of the drawing apparatus 200 including the light emitting device 202 may be reduced in the configuration that includes the cylindrical member 204.

In the drawing apparatus 200, the light emitting device 202 may be changed to have the same configuration as the configuration of the exposure device 150 according to the second exemplary embodiment or the exposure device 170 according to the third exemplary embodiment, instead of the same configuration as the configuration of the example 40 according to the first exemplary embodiment.

Supplementary Description

Although three light emitting units are disposed on a base in the exposure devices according to the first to third exemplary embodiments and the light emitting device according to the fourth exemplary embodiment, the present disclosure is not limited to this configuration. For example, a configuration in which one light emitting unit is disposed on a base, a configuration in which two light emitting units are disposed on a base, or a configuration in which four or more light emitting units are disposed on a base may be employed. In addition, the position of the plural light emitting units disposed on the base may be set, as appropriate.

In addition, although the base is formed of a metal block in the exposure devices according to the first to third exemplary embodiments and the light emitting device according to the fourth exemplary embodiment, the present disclosure is not limited thereto. The material or the shape of the base may be changed. For example, the base may be made of a resin or may be made of another metal material such as a sheet metal. Configuration components of the light emitting unit or the shapes and the like of the configuration components of the light emitting unit may be changed. Although the support of the light emitting unit is formed of a metal block, the present disclosure is not limited thereto. The material or the shape of the support may be changed. For example, the support may be made of a resin or may be made of another metal material such as a sheet metal.

In addition, in the exposure devices according to the first to third exemplary embodiments and the light emitting device according to the fourth exemplary embodiment, the shape, the position, and the number of the supply paths provided in the base also may be changed. The shape of the lower covering that forms the flow path of the air supply device, the position of the fan, the number of the fans, and the like also may be changed.

In addition, although air is introduced by the fan provided at the lower covering and the air is blown toward the light emitting units through the opening of the base in the exposure devices according to the first to third exemplary embodiments and the light emitting device according to the fourth exemplary embodiment, the present disclosure is not limited thereto. For example, it may be configured such that a fan is provided at a side covering at an end portion of the base in the width direction and air is sucked to thereby blow the air toward light emitting units through an opening of the base.

In addition, although the opening of the base is provided on the inner side of the base in the width direction from the light emitting units in the exposure devices according to the first to third exemplary embodiments and the light emitting device according to the fourth exemplary embodiment, the opening of the base may be provided at a position on the outer side of the base in the width direction from the light emitting units.

In the exposure devices according to the first to third exemplary embodiments and the light emitting device according to the fourth exemplary embodiment, the opening provided in the base may have any shape as long as it is possible with the shape to blow air toward the light emitting units. The opening may have, for example, a hole shape whose entire periphery is surrounded or a groove shape whose part of the periphery is opened.

In addition, although the photoreceptor drum is disposed on the lower side in the up-down direction with respect to the exposure device in the exposure devices according to the first to third exemplary embodiments, the photoreceptor drum may be disposed on the upper side in the up-down direction with respect to the exposure device. In addition, although the substrate of the cylindrical member is disposed on the upper side in the up-down direction with respect to the light emitting device in the light emitting device according to the fourth exemplary embodiment, the substrate of the cylindrical member may be disposed on the lower side in the up-down direction with respect to the light emitting device.

Although light is radiated from the light emitting device 202 to the substrate 206 attached to the cylindrical portion 204A of the cylindrical member 204 in the drawing apparatus 200 according to the fourth exemplary embodiment, the present disclosure is not limited to this configuration. For example, it may be configured such that a substrate is disposed on a table having a flat plate shape and light is radiated from a light emitting device to the substrate by moving the light emitting device and the table relatively in a direction intersecting one direction of the light emitting device.

In addition, although the substrate 206 is a plate for CTP to be used in a platemaking process in offset printing, and light is radiated from the light emitting device 202 to the region 206A of the substrate 206 in which the photosensitive material is disposed in the drawing apparatus 200 according to the fourth exemplary embodiment, the present disclosure is not limited to this configuration. For example, the light emitting device and the drawing apparatus described above may be used for exposure in manufacture of a printed wiring board (PWB). For example, a printed wiring board may be manufactured by drawing an image directly, without using a photo mask, on a substrate on which a photosensitive material such as a photoresist is applied. The substrate to be used may be a rigid substrate or may be a flexible substrate. When a flexible substrate is used, drawing may be performed while rotating the flexible substrate in a state of being fixed to the cylindrical member 204 in FIG. 13.

Further, the light emitting device and the drawing apparatus described above may be used for an application of a member to which photolithography is to be applied, such as formation of a color filter in a manufacturing process of a liquid crystal display (LCD), exposure of a dry film resist (DFR) in a manufacturing process of a thin film transistor (TFT), exposure of a dry film resist (DFR) in a manufacturing process of a plasma display panel (PDP), exposure of a photosensitive material such as a photoresist in a manufacturing process of a semiconductor element, exposure of a photosensitive material such as a photoresist in a platemaking process of printing other than offset printing, such as gravure printing, or exposure of a photosensitive material in a manufacturing process of a watch component. The photolithography is a technique in which a surface of a material on which a photosensitive material is disposed is exposed in a pattern form to generate a pattern including an exposed part and a non-exposed part.

In the light emitting device and the drawing apparatus described above, it may be possible to use any of a photon mode photosensitive material on which information is to be recorded directly by exposure and a heat mode photosensitive material on which information is recorded with heat generated by exposure. As a light source of the drawing apparatus 200, a LED element or a laser element is usable in accordance with an object to be exposed.

Although specific exemplary embodiments of the present disclosure have been described in detail, the present disclosure is not limited to such exemplary embodiments. It is obvious for a person skilled in the art that various other exemplary embodiments are possible within the scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A light emitting device comprising:
   a base that extends in one direction, and has an opening;
   a plurality of light emitting units that are disposed to be displaced from each other in the one direction on a front surface side of the base, wherein the plurality of light emitting units each comprises
   a support that extends in the one direction, and
   a plurality of light sources that are disposed in the one direction on the support; and
   an air blowing unit that blows air toward the plurality of light emitting units through the opening, wherein:
   a side portion of each of the light emitting units is provided with a driving substrate, and
   the base has the opening at a position that corresponds to the driving substrate.

2. The light emitting device according to claim 1, wherein the opening passes through the base from a rear surface side of the base toward the front surface side where the light emitting units are disposed.

3. The light emitting device according to claim 2,
   wherein the light emitting units are disposed above the base, and
   wherein the air blowing unit causes air to flow upward from a portion below the base.

4. The light emitting device according to claim 1, wherein the base includes a plurality of openings that are provided in the one direction.

5. The light emitting device according to claim 1,
   wherein each of the light emitting units is provided with a light emission portion through which light from the plurality of light sources is emitted, and
   wherein a cleaning mechanism, that cleans the light emission portion, is provided on a side opposite to the opening with respect to the light emitting unit.

6. The light emitting device according to claim 1, wherein the opening passes through the base in a direction that is oblique to a surface of the base.

7. The light emitting device according to claim 1,
   wherein the driving substrate has a heat generating element, and
   wherein the base has the opening at a position that corresponds to the heat generating element.

8. The light emitting device according to claim 1,
   wherein the plurality of light emitting units are disposed to be displaced from each other in a width direction that intersects the one direction of the base, and
   wherein the opening is provided on an inner side of the base in the width direction from the light emitting units.

9. The light emitting device according to claim 8, wherein the light emitting units are three light emitting units that are, in a plan view, disposed on the base alternately.

10. The light emitting device according to claim 8, wherein an inner side portion of each of the plurality of light emitting units in the width direction of the base is inclined inward with respect to a surface of the base.

11. The light emitting device according to claim 1,
wherein the opening in the base includes a plurality of openings that are provided in the one direction, and
wherein the air blowing unit further comprises a lower covering at which a flow path is provided, in the one direction of the base, to supply air to the plurality of openings.

12. The light emitting device according to claim 1, wherein the base is formed of a metal block.

13. The light emitting device according to claim 1, wherein the support is formed of a metal block.

14. The light emitting device according to claim 13,
wherein the light emitting units each include a light-emitting-element substrate at which the light source is provided, and
wherein the light-emitting-element substrate is disposed on a front surface side of the support, the front surface side being opposite to the base.

15. An image forming apparatus comprising:
the light emitting device according to claim 1; and
a region that moves relatively to the light emitting device in a direction that intersects the one direction, the region being a region in which a photosensitive material to which light from the light emitting device is radiated is disposed.

16. The image forming apparatus according to claim 15, wherein the region is provided on a surface of a cylindrical member that rotates in a circumferential direction.

17. A light emitting device comprising:
a base that is formed of a metal block that extends in one direction; and
a plurality of light emitting units that are disposed to be displaced from each other in the one direction on a front surface side of the base, wherein the plurality of the light emitting units each comprises
a support that extends in the one direction, and
a plurality of light sources that are disposed in the one direction on the support, wherein:
the base is provided with an opening in the one direction of the light emitting units,
a side portion of each of the light emitting units is provided with a driving substrate, and
the base has the opening at a position that corresponds to the driving substrate.

18. The light emitting device according to claim 17, wherein the opening in the base includes a plurality of openings that are provided in the one direction of the light emitting units.

19. The light emitting device according to claim 17,
wherein the plurality of light emitting units are disposed to be displaced from each other in a width direction that intersects the one direction of the base, and
wherein the opening is provided on an inner side of the base in the width direction from the light emitting units.

* * * * *